United States Patent [19]

Markulin

[11] Patent Number: 5,358,765
[45] Date of Patent: Oct. 25, 1994

[54] CELLULOSIC ARTICLE CONTAINING AN OLEFINIC OXIDE POLYMER AND METHOD OF MANUFACTURE

[75] Inventor: John Markulin, Oak Lawn, Ill.

[73] Assignee: Viskase Corporation, Chicago, Ill.

[21] Appl. No.: 15,751

[22] Filed: Oct. 25, 1994

Related U.S. Application Data

[63] Continuation-in-part of Ser. No. 846,455, Mar. 4, 1992, abandoned.

[51] Int. Cl.$^5$ .......................................... B65D 85/72
[52] U.S. Cl. ............................... 428/34.8; 138/118.1; 426/105; 426/129
[58] Field of Search ................. 428/34.8; 426/105, 90, 426/92, 127, 129; 138/118.1; 264/190, 191, 192, 193, 194

[56] References Cited

U.S. PATENT DOCUMENTS

| | | | |
|---|---|---|---|
| 2,489,310 | 6/1949 | Moss, Jr. | 264/190 |
| 2,792,279 | 5/1957 | Lytton | 264/194 |
| 2,805,169 | 9/1957 | Mitchell | 106/163.1 |
| 2,841,462 | 7/1958 | Lytton | 264/193 |
| 3,619,223 | 11/1971 | Brower et al. | 106/165 |
| 3,843,378 | 10/1974 | Smith | 106/168 |
| 4,121,012 | 10/1978 | Bockno | 428/369 |
| 4,163,463 | 8/1979 | O'Brien, Jr. | 138/118.1 |
| 4,169,163 | 9/1979 | Judd et al. | 426/92 |
| 4,198,325 | 4/1980 | Hammer et al. | 428/34.8 |
| 4,418,026 | 11/1983 | Blackie et al. | 264/8 |
| 4,596,727 | 6/1986 | Higgins et al. | 428/34.8 |
| 4,930,545 | 6/1990 | Hammer et al. | 428/34.8 |
| 4,933,217 | 6/1990 | Chiu | 428/34.8 |
| 5,047,197 | 9/1991 | Uneback et al. | 264/193 |
| 5,096,754 | 3/1992 | Hammer et al. | 428/34.8 |
| 5,230,933 | 7/1993 | Apfeld et al. | 428/34.8 |
| 5,288,532 | 2/1994 | Juhl et al. | 428/34.8 |

FOREIGN PATENT DOCUMENTS 741728 12/1955 United Kingdom .

OTHER PUBLICATIONS

Kovalev, G. D., "The Concept of Ecological Safety in Viscose Technology and Trends of Development", *Progress in Cellulosic Man-Made Fibers*, Sep. 9–12, 1991 Conference, Gothenburg, Sweden (sponsored by Berol Nobel).

Smith, D. K., "High Strength Regenerated Cellulose Fibers", *Textile Research Journal*, pp. 32–40 (Jan. 1959).

*Primary Examiner*—Ellis P. Robinson
*Assistant Examiner*—Rena L. Dye
*Attorney, Agent, or Firm*—Cedric M. Richeson

[57] ABSTRACT

A tubular cellulosic casing comprising cellulose or a cellulose derivative which has incorporated therewith a polyethylene oxide composition having a molecular weight of at least 70,000 and a method of manufacturing the same.

36 Claims, 1 Drawing Sheet in# CELLULOSIC ARTICLE CONTAINING AN OLEFINIC OXIDE POLYMER AND METHOD OF MANUFACTURE

CROSS-REFERENCE TO RELATED APPLICATION

The present application is a continuation-in-part application of copending U.S. application Ser. No. 07/846,455 filed Mar. 4, 1992 which is now abandoned, which application is hereby incorporated by reference in its entirety.

BACKGROUND OF THE INVENTION

The present invention relates to a cellulosic article and a method for manufacturing same. The present invention is particularly suitable for tubular food casings, such as sausage casings which may be provided in a shirred form.

It is known that cellulosic articles may be made by a variety of procedures. For example, cellulose with or without chemical modifications, may be put into solution with a solvent, e.g. by dispersion or by dissolution, and then shaped into an article followed by solvent removal (with or without chemical modification of the cellulose) to solidify or set the shape of the formed cellulosic article. Examples of known processes for production of cellulosic articles are the viscose, cuprammonium, N-methyl-morpholine-n-oxide, zinc chloride and cellulose carbamate processes as described e.g. in U.S. Pat. Nos. 1,601,686; 2,651,582; 4,145,532; 4,426,228; 4,781,931; 4,789,006; 4,867,204; and 4,999,149, the teachings of which are all hereby incorporated by reference. The formed article may have a variety of shapes including a filament, bead, sheet or film. It is contemplated that the present invention may utilize any known method of producing a cellulosic article of any shape. With further respect to the present invention, although the article may be of any shape, preferred are films, generally having a thickness of 10 mils (254 microns) or less. Both planar, spherical, cylindrical and tubular articles are contemplated with seamless tubular articles being preferred and tubular films being especially preferred.

The present invention is particularly useful with respect to the manufacture and use of food casings. Food casings used in the processed food industry are generally thin-walled tubing of various diameters prepared from regenerated cellulose, cellulose derivatives, and the like.

In general, cellulosic food casings have multifunctional uses in that they may be employed as molding containers during the processing of the food product encased therein and also serve as a protective wrapping for the finished product. In the sausage meat industry, the preparation of various types of sausages such as frankfurters in a variety of sizes usually involves removing the casing from about the processed meat prior to final packaging. These sausages from which casing is usually removed are generally formed and processed in nonfiber-reinforced (nonfibrous) cellulose casing. However, larger diameter sausages such as salami are frequently sold with the casing left on. These sausages are usually formed and processed in fiber-reinforced (fibrous) cellulosic casing.

The starting material in the manufacture of cellulosic food casings is high quality, relatively pure cellulose pulp (either cotton or wood), most typically in sheet form. In present commercial manufacture of nonfibrous cellulose sausage casings, regenerated cellulose is generally made using the well known viscose process whereby viscose is typically extruded through an annular die into a coagulating and regenerating bath to produce a tube of regenerated cellulose. (Rayon filaments or threads may be similarly made by extrusion through a spinning nozzle according to well known methods.) This tube is subsequently washed, plasticized e.g. with glycerine, and dried e.g. by inflation under substantial air pressure. A typical commercial viscose process is described below which utilizes cellulosic sheet starting materials having a suitable density between about 0.8–0.9 gm/cc.

This relatively pure cellulose is typically converted to alkali cellulose by steeping in a sodium hydroxide solution. Cellulose absorbs the sodium hydroxide and the fibers swell and open. The degree of steeping is preferably held to the minimum amount necessary to ensure uniform distribution of the sodium hydroxide on the cellulose. A steeping bath temperature of about 19°–30° C. is preferred, and a suitable sodium hydroxide concentration in the steeping bath is about 17–20 wt. %.

In a typical steeping apparatus there is no forced circulation of caustic between the cellulose sheets, so it is important that the rate of filling the apparatus with caustic (fill rate) be such that the caustic reaches every portion of the sheets. The cellulose sheets are typically held in place in the steeping chamber by a support frame, and a typical steep time in commercial practice is 50–60 minutes.

After steeping, the caustic is drained and excess absorbed sodium hydroxide solution is pressed out, typically by a hydraulic ram. A typical alkali cellulose composition is about 13–18% caustic, 30–35% cellulose and the remainder water (by wt.). The percent caustic and cellulose in the alkali cellulose is controlled by the well-known press weight ratio. This ratio is the weight of the wet cake after pressing divided by the weight of the original cellulose used. A typical press ratio is about 2.6–3.2. After the press out, the alkali cellulose is shredded, i.e. the fibers in the sheet are pulled apart so that during xanthation the carbon disulphide contacts all portions of the alkali cellulose. There is an optimum shredding time for each system which can only be determined by testing. Typical shredding time is about 40–90 minutes. Heat is generated during the shredding step and the temperature may, for example, be controlled by means of a cooling water jacket around the shredder, preferably in the range of 25°–35° C.

During a succeeding, preferred aging step, an oxidative process is initiated which breaks the cellulose molecular chains thereby reducing the average degree of polymerization which will in turn reduce the viscosity of the viscose to be produced. During the aging step the shredded alkali cellulose is preferably maintained in covered vessels to prevent drying.

The conversion of alkali cellulose to cellulose xanthate is accomplished by placing the shredded and aged alkali cellulose in a closed reactor known as a baratte and adding carbon disulphide which vaporizes and reacts with the alkali cellulose to form cellulose xanthate. The amount of carbon disulphide used to achieve the desired conversion to cellulose xanthate is typically equal in weight to about 26–38% of the bone dry weight cellulose in the alkali cellulose, and preferably only enough to produce cellulose xanthate with acceptable filtration characteristics.

The length of time required for the xanthation reaction (conversion of alkali cellulose to cellulose xanthate) depends on the reaction temperature and the quantity of the carbon disulphide. Variations in such parameters as the quantity of carbon disulphide used as well as the temperature, and pressure during xanthation is determined by the desired degree of xanthation. The percent total sulphur is directly related to the amount of carbon disulphide introduced, including xanthate and by-product sulphur. In general, xanthation reaction conditions are varied to ensure that adequate conversion is achieved by reaching a total sulphur content greater than about 1.1 wt. %. Typically, there is about 0.4–1.5% by wt. sulphur in the by-products admixed with cellulose xanthate.

The purpose of converting alkali cellulose to cellulose xanthate is to enable dissolution of the cellulose in a dilute solution of sodium hydroxide, e.g. 3.6–5.0 wt. %. This is the so-called viscose formation or "vissolving" step, in which sodium hydroxide is absorbed onto the cellulose xanthate molecule which becomes highly swollen and dissolves over a finite time period. This step is preferably accelerated by cooling and agitation. Sufficient cooling is preferably provided to maintain the mixture at about 10° C. or less. The quality of the solution is typically determined by measuring the filterability of the viscose e.g. by rate of clogging or throughput through a filter such as a cloth filter. The viscose is allowed to ripen and deaerate, is filtered under controlled temperature and vacuum. During ripening, reactions occur which result in a more uniform distribution of the xanthate group on the cellulose and a gradual decomposition of the xanthate molecule which progressively reduces its ability to remain dissolved, and increases the ease of viscose-cellulose regeneration.

Viscose is essentially a solution of cellulose xanthate in an aqueous solution of sodium hydroxide. Viscose is aged (by controlling time and temperature) to promote a more uniformed distribution of xanthate groups across the cellulose chains. This aging (also termed "ripening") is controlled to facilitate gelation or coagulation. If the desired product is a tube, the tubular form is obtained by forcing the viscose through a restricted opening, for example, an annular gap. The diameter and gap width of the opening, as well as the rate at which the viscose is pumped through, are designed in a manner well known to those skilled in the art for both non-reinforced and fiber-reinforced products such that a tubular film casing of specific wall thickness and diameter is formed from the viscose.

The extruded viscose casing is converted (coagulated and regenerated) to cellulose in the extrusion bath by action of a mixture of acid and salt, for example, sulphuric acid and sodium sulphate. A typical bath contains about 7–18% sulfuric acid by weight, and the bath temperature may be about 30°–56° C.

The cellulose casing emerging from the acid/salt bath is preferably passed through several dilute acid baths. The purpose of these baths is to ensure completion of the regeneration. During regeneration, gases (such as $H_2S$ and $CS_2$) are released through both the inner and outer surfaces of the casing, and means must be provided for removing these gases from the casing. After the casing has been thoroughly regenerated and the salt removed, it is preferably passed through a series of heated water baths to wash out residual sulfur by-products.

Cellulose articles for use as sausage casing require plasticization e.g. with moisture and/or polyols such as glycerine. Without such plasticization the casings are too brittle for commercial use. Typically, a softener such as glycerine is added in the final water bath by way of a dip tub, and in a quantity of about 11–16% based on the bone dry cellulose weight (for typical nonfibrous casing). The regenerated cellulose casings are also typically dried e.g. by inflation with heated air. After drying, the casing is wound on reels and subsequently shirred on high-speed shirring machines, such as those described in U.S. Pat. Nos. 2,984,574, 3,451,827, 3,454,981, 3,454,982, 3,461,484, 3,988,804 and 4,818,551. In the shirring process, lengths of from about 40 to about 200 feet of casing are typically compacted (shirred) into tubular sticks of between about 4 and about 30 inches. The shirred casing sticks are packaged and provided to the meat processor who typically places the sticks over a stuffing horn and causes the casing sticks to be deshirred at extremely high speeds while stuffing the deshirred casing with a foodstuff such as meat emulsion. The encased foodstuff can be subsequently cooked and the casing removed, from e.g. meat processed therein, with high-speed peeling machines.

For fibrous casing, a process of manufacture similar to that for nonfibrous casing is employed, however, the viscose is extruded onto one or both sides of a tube which is usually formed by folding a web of paper so that the opposing side edges overlap. In production of fibrous casing the viscose impregnates the paper tube where it is coagulated and regenerated to produce a fiber-reinforced tube of regenerated cellulose. The paper provides fiber reinforcement which is generally utilized in tubular casing having diameters of about 40 mm or more in order to provide dimensional stability, particularly during stuffing with meat emulsion. Production of both nonfibrous and fibrous casing is well-known in the art and the present invention may utilize such well known processes modified as disclosed herein.

Cellulosic casings are typically humidified to a level sufficient to allow the casing to be shirred without undue breakage from brittleness. A humectant may be employed to moderate the rate of moisture retention and casing swelling to produce a casing which during the shirring operation has sufficient flexibility without undue swelling or sticking of the casing to the shirring mandrel. Typically, a lubricant such as an oil will also be used to facilitate passage of the casing through the shirring equipment e.g. over a shirring mandrel.

It has been useful to lubricate and internally humidify cellulose casings during the shirring process by spraying a mist of water and a lubricant through the shirring mandrel. This is an economical, fast and convenient way to lubricate and/or humidify the casing to increase the flexibility of the casing and facilitate high speed shirring without undue detrimental sticking, tearing or breakage of the casing.

Cellulosic food casings suitable for use in the present invention may have a moisture content of less than about 100 wt. % based upon the weight of bone dry cellulose (BDC). The term "bone dry cellulose" as used herein refers to cellulose such as regenerated cellulose and/or paper which has been dried by heating the cellulose in a convection oven at 160° C. for one hour to remove water moisture. In the formation of cellulosic casing e.g. by the viscose process, regenerated cellulose prior to drying forms what is known as gel stock casing having a high moisture content in excess of 100 wt. % BDC. This gel stock casing is unsuitable for stuffing with food such as meat emulsion, e.g. to form sausages, because it has insufficient strength to maintain control of stuffing diameter and prevent casing failure due to bursting while under normal stuffing pressure. Gel stock casing is typically dried to a moisture level well below 100 wt. % (BDC) which causes the regenerated cellulose to become more dense with increased intermolecular bonding (increased hydrogen bonding). The moisture level of this dried casing may be adjusted, e.g. by remoisturization, to facilitate stuffing. Such remoisturization or moisture adjustment to a specific level, for nonfibrous casing, is typically to a level with a range of from about 5 to about 40 wt. % BDC. Small diameter nonfibrous casing, prior to shirring, will have been dried to a typical moisture content of about 10–20 wt. % BDC, and such small diameter nonfibrous casing when shirred will have a moisture content that has been adjusted to between about 20 to 40 wt. % BDC.

For fibrous casing, casing is commercially produced having a moisture content ranging from about 4 wt. % BDC to about 70 wt. % BDC. Typically, fiber-reinforced casing having a moisture level between about 4 to about 25 wt. % BDC will be soaked prior to stuffing by a food processor. Premoisturized, ready-to-stuff, fibrous casing is also commercialized. Premoisturized fibrous casing which does not require additional soaking or moisturization will typically have a moisture content of from about 26 to about 70 wt. % BDC.

In the formation of skinless (casing removed) frankfurters, sausage proteins coagulate, particularly at the sausage surface, to produce a secondary skin and allow formation of a liquid layer between this formed skin and the casing as described in U.S. Pat. No. 1,631,723 (Freund). In the art the term "skinless frankfurter" is understood to mean that the casing is or is intended to be removed by the producer and that such casing may be removed because of formation of the secondary "skin" of coagulated proteins on the surface of the frankfurter. This secondary skin forms the outer surface of the so called "skinless frankfurters". Skin formation is known to be produced by various means including the traditional smoke curing with gaseous smoke, low temperature drying, application of acids such as citric acid, acetic acid or acidic liquid smoke or combinations thereof. Desirably, this secondary skin will be smooth and cover the surface of the frankfurter. Formation of a liquid layer between the casing and the frankfurter skin relates to the meat emulsion formulation, percent relative humidity during the cooking environment, subsequent showering and steam application to the chilled frankfurter and presence of any peeling aid coatings at the casing/frankfurter interface.

In present commercial production of tubular cellulose casings it would be desirable to improve process efficiency, productivity and costs with respect to certain process steps. For example, during the cellulose regeneration step, as described above, sulfur-containing gases and water vapor accumulate inside the regenerating tube. These waste gases must be removed, and this is commonly done by slitting the casing walls at intervals so the waste gases may be vented. However, the slit sections of cellulose tube must be ultimately removed and the adjoining sections spliced together. This procedure is time consuming, labor intensive and results in product waste because the slit sections of tubing must be discarded. So there is a long-standing need in cellulose casing production to reduce the required frequency of puncturing/slitting. The potential advantages would include higher extrusion speed (if the time interval between puncturing/slitting is to remain constant) or longer intervals between puncturing/slitting if the extrusion speed is to remain constant.

One limitation of the prior art cellulose tube manufacturing system is the time, equipment expense and material cost required to add softener to the casing. Most commonly this involves the additions of between about 10 and 20% glycerine to nonreinforced cellulose tubing and between about 15 and 35% glycerine to fiber-reinforced cellulosic casing (all on a total weight basis of casing). It is certainly desirable to reduce or even eliminate the need for this softener addition step. This has not heretofore been possible because low softener content reduces the flexibility of the cellulose tube wall, thereby causing excessive breakage due to inherent distortions during the shirring and compression steps to form the as-sold shirred stick. Low softener content may also result in excessive breakage when, after a storage period of typically at least ten weeks before use, the stick is deshirred by the food processor and stuffed with food, e.g. frankfurter emulsion.

Another disadvantage of the softener requirement is that unabsorbed softener is a substantially noncompressible liquid which resists compression during shirring. Moreover, the softener tends to make the shirred and compressed stick expand or grow immediately after manufacture, so either the sticks must be allowed time for longitudinal stabilization before packaging for shipment to food processors, or placed in cartons with unrestricted space at the ends for longitudinal growth. The latter is undesirable because the longitudinally slidable sticks may tend to bow and break. It will also be apparent that the softener adds weight to the shirred stick shipping carton, and that the casing manufacturer wishes to provide food processing customers with sticks having the highest useable inflatable casing length per unit length shirred stick, often referred to as "pack ratio".

Olefinic oxide polymers such as poly(ethylene oxide) are known materials having a wide variety of suggested uses. Various grades of a commercially available poly(ethylene oxide) sold under the trademark POLYOX ® have been suggested as useful as adhesives, flocculants, and filler retention and drainage aids in the manufacture of paper and paperboard products. Other suggested uses include, thickeners for paints, drag-reducing additives for water used in fire fighting, lubricants and thickeners for personal care products such as toothpastes and shaving preparations, and also as dispersant, binders and rheology control agents in a variety of applications. Poly(ethylene oxide) has also been used in water soluble packaging films and to increase water retention in soil. Other functions and uses are disclosed in the brochure POLYOX ® WATER-SOLUBLE RESINS (Union Carbide Chemicals & Plastics Technology Corporation, 1990).

Poly(ethylene oxide) is known as an additive to thermoplastic films to promote biodegradability. It is susceptible to severe auto-oxidative degradation and loss of viscosity in aqueous solutions. According to the *Handbook of Water-Soluble Gums and Resins* by Robert C. Davidsons, (published by McGraw-Hill Book Company, 1980) the degradation mechanism involves the formation of hydroperoxides that decompose and cause cleavage of the polymer chain. The rate of degradation is increased by heat, ultraviolet light, strong acids, or certain transition metal ions.

The present invention ameliorates the above noted limitations or disadvantages in various embodiments as further described below.

One object of this present invention is to provide an improved cellulosic tube with lower polyhydric alcohol softener content than heretofore used.

A further object is to provide a shirred cellulosic tube without polyhydric alcohol softener but still having high coherency and low breakage rate.

Another object is to provide a shirred cellulosic tube stick with higher pack efficiency than heretofore achieved under equivalent shirring and compression conditions.

Still another object is to provide a method for manufacturing a cellulosic casing wherein less waste gases are produced during the cellulose regeneration step.

A further object is to provide a sausage casing having improved peelability under difficult peeling conditions.

Another object is to provide a casing which either before drying (gel stock) or after drying (semi-finished) has a faster rate of absorption i.e. it takes up and holds greater amounts of water or liquid based (especially aqueous) coatings such as migrating or nonmigrating colorants, flavorants, antimycotics, liquid smokes, skin forming agents, preservatives, peeling aids or meat adhesion promoters in a shorter period of time.

Still another object is to provide a cellulosic casing having an olefinic oxide polymer such as poly(ethylene oxide) which has an average molecular weight of at least about 70,000 uniformly incorporated with cellulose.

An additional object is to provide a cellulosic casing having a plurality of layers or sections wherein an olefinic oxide polymer is uniformly incorporated or dispersed throughout at least one layer or section (preferably the innermost layer of a tubular article) but optionally not in all layers or sections.

Yet another object is to provide a casing having a combination of high packing efficiency and a high bore size.

A further object is to provide a casing having a combination of high packing efficiency and high pack ratio.

Another object is to provide a method for manufacturing a regenerated cellulose casing using a viscose process having a faster rate of regeneration.

Still another object is to provide a method for manufacturing a casing which fulfills any of the above objects.

An additional object is to provide a method for manufacturing a shirred cellulosic casing stick with high pack ratio, high coherency and low breakage.

These and other objects and advantages of this invention will be apparent from the ensuing disclosure and appended claims. It is not necessary that each and every object listed above be found in all embodiments of the invention. It is sufficient that the invention may be advantageously employed relative to the prior art.

SUMMARY OF THE INVENTION

According to the present invention a cellulosic, preferably tubular, article is provided which contains an olefinic oxide polymer, preferably poly(ethylene oxide), uniformly dispersed in admixture with the cellulose. The olefinic oxide polymer-to-cellulose weight ratio is preferably at least about 1:200 and the olefinic oxide polymer has an average molecular weight of at least about 70,000.

The invention may be suitably employed in the form of nonfibrous or fibrous food casings. The inventive food casing may be stuffed with a food product such as a meat emulsion of e.g. beef, pork, turkey, chicken, fish or mixtures thereof, or with a dairy product such as cheese or with a vegetable product such as soybean-derived protein or tofu. It is contemplated that mixtures of animal and vegetable products may be encased and that these products may be cooked or uncooked, pasteurized, fermented, frozen, dried or processed in any of a variety of well-known ways of processing food. A particular desirable form of the invention is an encased meat sausage, and a most advantageous use and embodiment of the invention is for the production of skinless frankfurters using small diameter (circumference <115 mm) nonfibrous casing. Another advantageous embodiment is for the production of large diameter (circumference >115 mm) sausages using fiber-reinforced casing in which the casing is often left on food products if printed, or peeled off and repackaged if unprinted. An inventive method of manufacture is also disclosed which admixes the polymer additive in a solution of cellulose or a cellulose derivative prior to extrusion and solidification into a formed article.

The invention in its various embodiments exhibits many advantages. It is not necessary that each embodiment of the invention exhibit or have each possible advantage which are disclosed herein. It has been particularly noted that the present invention may be usefully employed to produce cellulosic films particularly from viscose which may have: increased gloss or transparency, faster by-product removal or wash out; extended puncture intervals to remove unwanted gases during the washing steps, faster regeneration and improved moisture control.

DETAILED DESCRIPTION OF THE INVENTION

Figure 1:
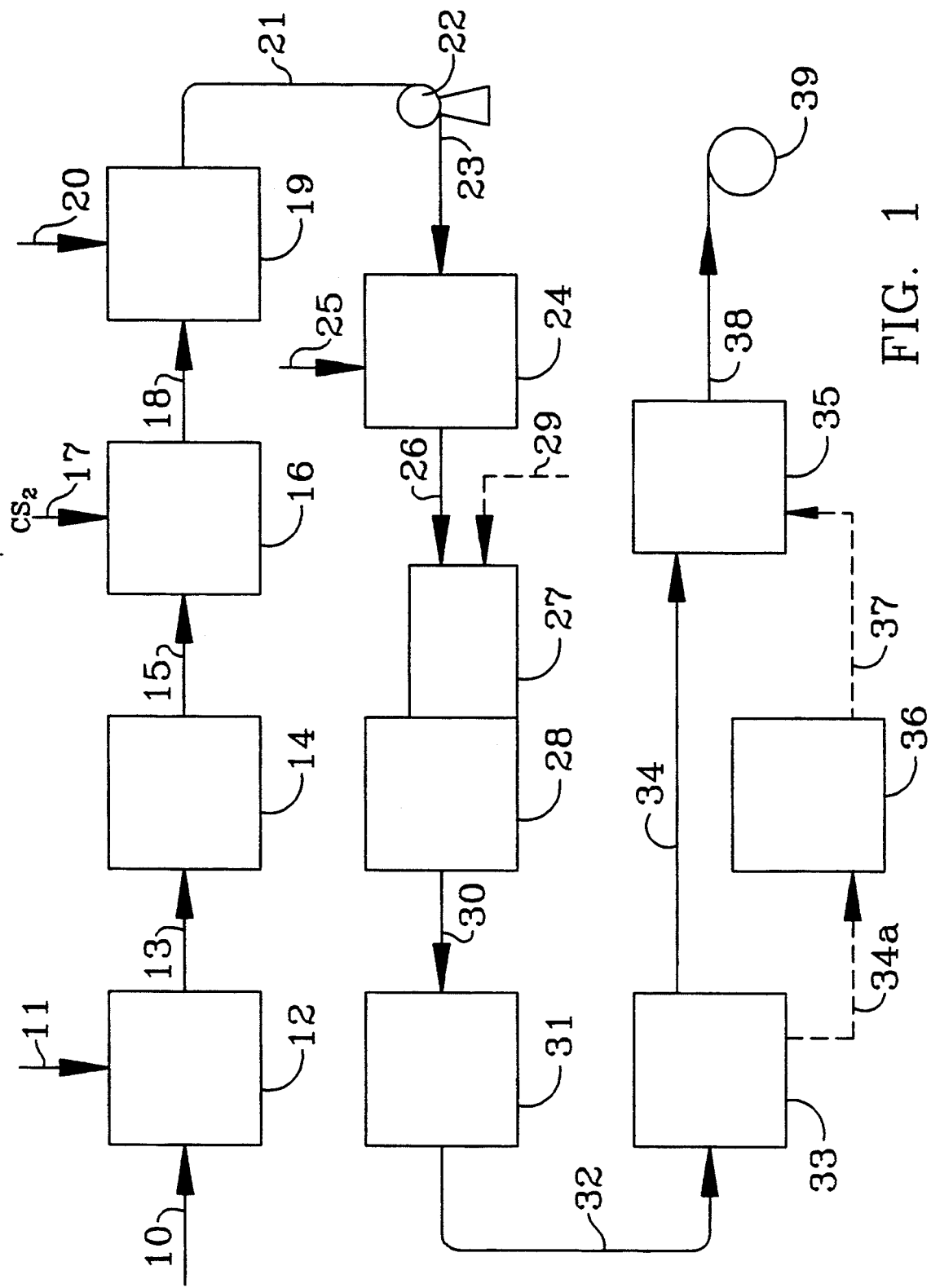
FIG. 1 is a schematic representation of a process for making an article according to the present invention.

According to the present invention, a tubular cellulosic article such as a casing is provided, which may encase a food product such as a sausage. This inventive casing generally comprises an elongated tube, made of a cellulose material, more preferably regenerated cellulose which contains an olefin oxide polymer such as poly(ethylene oxide) incorporated therein. Regenerated cellulose may be made by the well known viscose process, however other processes as disclosed above such as the cuprammonium process are known and may be employed.

The casing may advantageously be employed to process food such as sausages. The casing may be stuffed with a meat emulsion such as beef, pork or turkey, cooked, and either sold with the casing left on or the casing may be peeled off and the foodstuff repackaged for retail sale.

Cellulose casings of the present invention may be fiber-reinforced (fibrous) or not (nonfibrous) and may be classified as either small diameter casing (circumference less than 115 mm) or large diameter casing (circumference greater than 115 mm). Any size circumference of nonfibrous casing capable of having utility as a food package is suitable, but preferably the casing will have a circumference of from about 1.6 to about 3.8 inches (4.4–9.7 cm). Similarly, for fibrous casing any circumference will be suitable, but preferably the casing will have a circumference of from about 4.1 to about 21.6 inches (10.4–54.9 cm).

Generally, the casing wall thickness will be at least 0.7 mil and for nonfibrous casings will range from about 0.7 to about 4 mils (0.02–0.1 mm) with larger thicknesses being utilized in casings intended to stuff ham and turkey rolls and meat chunk type products. Wieners and frankfurters are typically smaller diameter products which are subjected to extremely fast stuffing and peeling operations and utilize fine ground meat emulsions. Small diameter nonfibrous casings used for stuffing wiener and frankfurter-type products e.g. to make skinless hot dogs will typically have thin casing wall thicknesses to enable production of shirred casing sticks containing greater lengths of casing. Typically the thickness or width of the casing wall for production of such frankfurter-type sausages will be from about 0.8 to about 2.0 mils (0.02–0.05 mm), preferably from about 0.9 to about 1.5 mils (0.023–0.038 mm).

Typically, fiber-reinforcements such as paper tube will add a thickness of between about 2.5 and 3.5 mils (0.064–0.089 mm), although thicker or thinner tubes may be employed.

Olefinic oxide polymers such as poly(ethylene oxide) with molecular weights of at least about 70,000 and up to about $5 \times ^6$ are dry, free-flowing white powders, which are substantially completely soluble in water at temperatures up to about 98° C. They are substantially crystalline materials. Commercially available materials reportedly have melting points ranging from about 62° to 67° C. as determined by X-ray and NMR standard methods of analysis and polymer densities of from about 1.15–1.26 g/cm$^3$. The chemical structure of poly(ethylene oxide) resin is

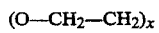
$(O-CH_2-CH_2)_x$

The very high molecular weights of these resins indicate materials having extremely small concentrations of reactive end groups resulting in resins having little or substantially no end group reactivity. As used herein the term "molecular weight" refers to the weight average molecular weight (Mw).

Poly(ethylene oxide) is commercially available from Union Carbide Corporation under the trademark POLYOX®. POLYOX® water-soluble resins, CAS Registry No. 25322-68-3, are described as being nonionic water soluble polymers of poly(ethylene oxide) which are available in a range of molecular weights. Referring to the above formula the degree of polymerization of POLYOX® resins are disclosed as ranging from "X" having a value from about 2,000 to about 180,000. Further information of the properties, functions and uses of POLYOX® resins are disclosed in the brochure POLYOX® WATER-SOLUBLE RESINS (Copyright 1988, 1990, Union Carbide Chemicals & Plastics Technology Corporation) which brochure is hereby incorporated by reference in its entirety.

In one embodiment of the invention poly(ethylene oxide) having a weight average molecular weight of at least 90,000 is used. Poly(ethylene oxide) having a weight average molecular weight between about 90,000 and 200,000 or between about 100,000 and 4,000,000 may be suitably employed. Higher molecular weight olefin oxide polymers are generally less expensive than lower weight materials. For example, in one embodiment an olefin oxide polymer such as poly(ethylene oxide) having a weight average molecular weight of at least 1,000,000 has been found to be suitable. Lower weight materials may produce cellulose articles which are more transparent and have less haze than higher molecular weight materials. Preferred olefin oxide polymers have a weight average molecular weight which is less than 1,000,000 and most preferably in the range from between 100,000 to 300,000. These materials are easy to incorporate without undue leaching and maintain good optical properties. Preferably the olefin oxide polymers used in the present invention are linear, especially linear homopolymers and most preferably linear homopolymers of poly(ethylene oxide).

Fundamental to the present invention is incorporation of an olefinic oxide polymer such as poly(ethylene oxide) in a cellulosic article. Such olefinic oxide polymer should be of a sufficiently high molecular weight that it will be retained in the cellulosic article in which it has been incorporated even though the article may be contacted or washed with a solvent such as water. The amount of olefinic oxide polymer retained should be sufficient to impart at least some of the desirable advantages described below and any amounts which might be leached out in normal use should be minimal and in any case not destroy the utility of the article for its intended purpose.

It is believed that olefinic oxide polymers such as poly(ethylene oxides) of molecular weights as low as 70,000 may be incorporated in cellulose to produce useful articles especially tubular films, preferably tubular food packaging, most preferably sausage casings. These articles are believed to be resistant to leaching out of the oxide polymer and are further believed to not undesirably suffer from defects associated with leaching such as lack of strength which defects may be found in cellulose articles to which lower molecular weight materials such as polyethylene glycols (PEGs) having a molecular weight of about 20,000 or less have been added. It is believed that poly(ethylene oxides) (hereinafter also referred to as "PEO") of about 70,000 or higher molecular weight would retain advantages of the commercially available higher molecular weight PEO's such as that sold under the trademark POLYOX WSRN-10.

Poly(ethylene oxides) are used as thickening agents in water. Small concentrations of high molecular weight resins can reduce by up to 80% the turbulent frictional drag of the water in which they are dissolved.

It is believed that the improved performance of the cellulosic tubular article of this invention is at least partially due to the greater dimensional stability of the article which is made possible by a uniform dispersion of the olefinic oxide polymer in the tube wall. It appears that this compound provides a high rate of moisture absorption during the casing finishing operation. For example, it has been observed that when the inventive casing is moisturized immediately prior to high speed shirring-compression, uniform absorption is virtually complete for a poly(ethylene oxide)-containing nonreinforced cellulosic casing by the end of the shirring step and before the final compression in the product shirred stick form. In particular, comparative tests show less shirr solution left on the mandrel with this casing as compared to an otherwise identical cellulosic casing lacking the poly(ethylene oxide). As a result, the shirred sticks of this invention do not longitudinally expand as much as a conventional commercially available nonreinforced shirred cellulosic casing stick. It is of course well-known that when cellulose is wetted, it swells or grows in size. If the cellulose casing is not completely or uniformly moisturized when it is compressed, the unwetted portions will grow or swell when the moisture subsequently contacts these portions.

Another contributing factor to the greater dimensional stability of this cellulosic tubular article may be that the rapidly uniformly moisturized article forms tighter shirred pleats which hold the stick together. That is, the pack ratio of the shirred embodiment of the inventive article is higher than the pack ratio of an otherwise identical casing shirred and compressed under equivalent conditions.

Finally, since the conventionally used polyhydric alcohol-type softener may be avoided with this invention, the mass of the article to be compressed is reduced and this in turn produces stronger pleats.

The as-manufactured cellulosic casing maybe used by food manufacturers in reeled form, but in most instances the casing is pleated, i.e. shirred, and then longitudinally compressed into a compact "stick" form. When this is done, the moisture content is usually raised immediately prior to shirring, from a level of about 15% (total weight resin) to about 30% (total weight basis). Such moisturization raises the water content of the cellulose casing to a level suitable for stuffing. That is, the de-shirred casing may be stuffed by high speed machinery without further moisturization.

Casings containing an olefinic oxide polymer such as poly(ethylene oxide) are believed to have a lower co-efficient of friction than similar casings not containing an olefinic oxide polymer. Tests of both static and kinetic co-efficients of friction have indicated lower values for uncoated casings containing poly(ethylene oxide) (reported molecular weights of 100,000 and 4 million) relative to both glycerine dipped and non-glycerine dipped similar casings which do not contain an olefinic oxide polymer. It is believed without wishing to be bound by the belief that this lower co-efficient of friction may contribute to improvements in machinability of the casing during shirring, stuffing and other processing operations.

It has been determined that the inventive casings (semi-finished i.e. after drying but before shirring) containing an olefinic oxide polymer have increased rates of absorption of water relative to prior art commercial casings not containing an olefinic oxide polymer. Thus, the inventive casings have a greater rate of absorption both as gel stock (before drying) and after drying. Semi-finished (unshirred) casing made according to the present invention may absorb more water than an equal weight of prior art cellulose casing under similar production conditions prior to reaching equilibrium although the ultimate equilibrium capacities may be similar. Changes in relative humidity are not believed to affect the inventive casings any differently than standard commercial prior art casings. Advantageously, the faster rate of absorption promotes uniform swelling which contributes to efficient formation of shirred sticks of casing having uniform physical properties. This also provides greater control and reliability with respect to packaging of the shirred sticks. The shirred sticks do not expand or grow in length as much as prior art casing and therefore they may be packed more closely in boxes and because the sticks weigh less and the same amount of casing may be packed into a smaller space, less expensive and smaller packages may be used if desired. Additionally, the greater rate of absorption allows larger amounts of coatings or additives to be incorporated into the casing in the same or less contact time as presently used in production. In particular, colorants for self-coloring casings, peeling aids and liquid smokes may be absorbed at higher rates reducing equipment needs and allowing for increased process speeds or greater loading levels at fixed production times.

Beneficially, liquid smokes may be incorporated in casings of the present invention. The increased rate of absorption of olefin oxide polymer containing cellulose casing permits increased loading of liquid smokes during fixed contact times in production which times are typically less than that required to saturate the casing. This increased rate may be beneficially employed to economically produce darker smoke colored casings. Such darker casings have increased eye appeal in markets where the meat processor sells the product with the casing left on. Similar, increased absorption of colorants may produce darker colored casing or self coloring casing having greater color transferability. Both tar containing and tar depleted liquid smokes may be used on both nonfibrous and fiber-reinforced casings. These casings may or may not also have other coatings such as peeling aids. Advantageously, acidic, neutralized, or alkaline liquid smokes may be used. In one preferred embodiment for nonfibrous casing, tar-depleted liquid smoke treated casing is made utilizing an acidic tar-depleted concentrated liquid smoke prepared e.g. in accordance with the teaching of U.S. Pat. No. 4,540,613. Preferably this liquid smoke is externally applied to the casing using a dip tank or a foam applicator. This may be done, e.g. by a process similar to that disclosed in U.S. Pat. No. 4,356,218. Preferably the casing will have been treated prior to addition of the liquid smoke with phosphates to inhibit formation of black spots or discoloration e.g. in accordance with U.S. Pat. No. 4,511,613. Beneficially, the casing is treated with a base prior to addition of the acidic liquid smoke such that upon drying of the liquid smoke treated casing and prior to shirring, the casing has a Ph value of from about 5 to 6. The descriptions and teachings of U.S. Pat. Nos. 4,540,613; 4,356,218; and 4,511,613 are hereby incorporated by reference in their entireties. Suitably, the tar-depleted smoke treated casings will contain at least 2 mg., and preferably at treated about 5 mg. or more of smoke constituents per square inch of food casing contact area. Tar containing liquid smokes may also be employed, particularly in fiber reinforced casings. Cellulose casings containing poly(ethylene oxide) as part of the casing structure according to the present invention may also be coated with liquid smoke and/or peeling aid solutions as described in U.S. Pat. Nos. 5,030,464; 4,889,751; 4,377,187; 4,572,098; 4,377,606; 4,446,167; 4,442,868; 4,525,397 and 4,104,408.

The pre-shirring moisturization is most commonly accomplished by means of a spray applied to the casing inner wall. This spray may include other components as for example humectants such as propylene glycol to retard the rate of water uptake as for example describe in Chiu U.S. Pat. No. 3,981,046, or peeling-aid solutions.

Such peelability enhancing agents include, but are not limited to, carboxymethyl cellulose and other water soluble cellulose ethers, the use of which is disclosed in U.S. Pat. Nos. 3,898,348 and 4,596,727, the disclosures of which are incorporated herein by reference in their entireties; "Aquapel", a Hercules, Inc. trademarked product comprising alkyl ketene dimers, the use of which is further disclosed in U.S. Pat. No. 3,905,397 issued Sep. 16, 1975 to H. S. Chiu, the disclosure of which is incorporated herein by reference; and "Quilon", an E. I. Dupont de Nemours Co., Inc. trademarked product comprising fatty acid chromyl chlorides, the use of which is further disclosed in U.S. Pat. No. 2,901,358 issued Aug. 25, 1959 to W. R. Underwood et al., the disclosure of which is incorporated herein by reference.

As previously mentioned above, it is known in the art that ease of peeling of the casing, particularly for skinless frankfurters is directly related to skin formation and production of a liquid layer or coating between the casing and the "skin" of the sausage. Under some conditions, peeling the casing from the processed sausage has presented problems, particularly in the production of so called "skinless" frankfurters where large numbers of the product are involved and especially in commercial operations using high-speed automatic stuffing and peeling machines.

When the casing is removed from the meat mass by automatic high-speed peeling machines, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from product encased therein. The use of high-speed, automatic peeling machines in commercial operations, for example, as disclosed in U.S. Pat. Nos. 2,424,346; 2,514,660; 2,686,927; 2,757,409; 3,312,995; 3,487,499; and 3,608,973 makes it particularly essential that there be minimal resistance to the separation of casing from sausage, or the product will jam at the peeler or go through unpeeled. Less than complete removal of the casing necessitates the expense and inconvenience of hand sorting and peeling.

Heretofore, many attempts have been made to provide casings having easy release characteristics. It is known in the art, as disclosed, for example, in U.S. Pat. Nos. 2,901,358 to Underwood et al., 3,106,471 and 3,158,492 to Firth, 3,307,956 to Chiu et al., 3,442,663 to Turbak and 3,558,331 to Tarika, that the application of certain types of coating to the inside wall of food casings may afford improvement in the release characteristics of the casing from the encased sausage product. Use of peeling aids or release coatings have helped to overcome these peelability problems. Following cooking, cooling and hydrating, water-soluble cellulose ether containing peeling aids help release the casing from the frankfurter skin by formation of a slippery layer between the casing and the frankfurter skin.

Typical water-soluble cellulose ethers which may be employed are the non-ionic water-soluble alkyl and hydroxyalkyl cellulose ethers such as, for example, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, for example, carboxymethylcellulose and carboxymethyl hydroxyethylcellulose. Mixtures of nonionic and anionic water-soluble cellulose ethers may also be employed. Commercially, carboxymethylcellulose (CMC) and carboxymethylhydroxyethylcellulose are almost always sold as the sodium salt, and it is well established trade practice not to refer to the commercial product as the sodium salt. For the purpose of this application, reference to these anionic materials shall include salts thereof e.g. the sodium salt and other alkali metal sales thereof.

The amount of water-soluble cellulose ether present on the internal surface of the food casing, which is necessary to impart desired release characteristics, can vary over a wide range; though very small quantities are actually required. In general, tubular casings of the present invention will contain at least about 0.001 milligram of cellulose ether per square inch of casing surface (0.0002 mg/cm$^2$), and preferably between about 0.002 mg/in$^2$ and 0.09 mg/in$^2$ (0.0003–0.014 mg/cm$^2$) of said cellulose ether. Especially preferred are casings having a coating on the internal surface thereof between about 0.03 mg/in$^2$ and 0.07 mg/in$^2$ (0,005–0.011 mg/cm$^2$) of said cellulose ether. Greater amounts of the cellulose ether component may be used, if desired, although generally it will not materially improve the release characteristics of the casing and with certain types of meat formulations or processing conditions, fat separation may be encountered.

Peeling aid coatings will typically comprise a release agent such as a water-soluble cellulose ether (as described above) in combination with an anti-pleat lock agent.

Anti-pleat lock agents suitable for use in admixture with peeling aid release agents such as water-soluble cellulose ethers to prepare easy peeling coatings on the casings of the present invention include synthetic, natural, and modified oils including mineral, vegetable and animal oils such as refined animal and vegetable oils that are normally liquid at room temperature or have a melting point below about 100° F., food grade mineral oil, silicone oils and medium chain triglycerides. Also suitable as an anti-pleat lock agent are substances such as lecithin and derivatives thereof. Materials that are or may be placed in a dispersible form in media solutions have been found to be suitable. Typical of this type of material would be, for example, an aqueous emulsion of castor oil or mineral oil. Particularly suitable and preferred as an anti-pleat lock agent is mineral oil.

By use of the term "anti-pleat lock agent" is meant material which is capable of promoting deshirring of pleats by minimizing any tendency of the pleats of a shirred casing stick to unduly adhere to each other and thereby damage the casing by creation of pinholes, tears or breaks during deshirring and stuffing. The anti-pleat lock agent will preferably be effective in the presence of a water-soluble cellulose ether such as carboxymethylcellulose which ether is known to promote adhesion of pleats prior to deshirring.

Suitable amounts of anti-pleat lock agent such as mineral oil will be present on the inner surface of the casing in order to effectively assist in deshirring and to reduce deshirr forces. Suitable amounts of an anti-pleat lock agent, preferably mineral oil, may range from about 0.05 mg/in$^2$ to about 0.3 mg/in$^2$ or more (0.008–0.047 mg/cm$^2$), and preferably will be from 0.1 to 0.2 mg/in$^2$ (0.016–0.031 mg/cm$^2$).

Lecithin is an anti-pleat lock agent which may also act as a surfactant with both wetting and emulsifying properties. It may also promote peelability of the casing. Lecithin is a mixture of diglycerides of stearic, palmitic and oleic acids, linked to the choline ester of phosphoric acid. Most commercial lecithin is a mixture of naturally occurring phospholipids which are derived from soybeans. Typical soybean lecithin comprises the following acids with approximate percentages; palmitic (12%), stearic (4%), palmitoleic (9%); oleic (10%), linoleic (55%) linolenic (4%) and $C_{20}$ to $C_{22}$ acids including arachidonic (6%). Lecithin is known to function as a release aid, dispersant, lubricant, softener and to control viscosity, in various food industry applications. Lecithin is an amphoteric emulsifier. As used herein, the term "lecithin" includes both unsubstituted lecithin and substituted lecithin which has been modified by chemical means and the individual phospholipid constituents thereof, particularly phosphatydylcholine.

Since lecithin may be utilized as an anti-pleat lock agent or possibly to enhance or potentiate a peeling aid, the amount of lecithin present on the internal surface of the casing may vary over a wide range. In general, the preferred tubular casings of the present invention will contain sufficient lecithin to effectively and favorably impact upon peelability, and/or the deshirr forces. The water-soluble cellulose ether, and lecithin combination, particularly with an anti-pleat lock agent such as mineral oil and a surfactant such as ethoxylated monodiglycerides may show improved peelability, relative to peeling aid compositions without lecithin. Suitable amounts of lecithin may range from about 0.05 to 0.50 mg/in$^2$ and preferably range from about 0.1 to 0.2 mg/in$^2$.

Surfactants suitable for use in the coating compositions on casings according to the present invention include those surfactants which act as wetting agents for the cellulosic casing surface and/or as emulsifying agents for oil such that the surfactant facilitates dispersion of the coating composition across the surface of the cellulosic casing. Nonlimiting examples of suitable surfactants include water dispersible or at least partially water-soluble surfactants such as alkylene oxide adducts of either fatty acids or partial fatty acid esters, for example, ethoxylated fatty acid partial esters of such polyols as anhydrosorbitols, glycerol, polyglycerol, pentaerythritol, and glucosides, as well as ethoxylated monodiglycerides, sorbitan trioleate, lecithin, and aliphatic polyoxyethylene ethers such as polyoxyethylene (23) lauryl ether.

Preferred surfactants include polyoxyethylene sorbitan fatty acid esters or mixtures thereof such as those sold under brand designation Tween such as Tween 80 (polyoxyethylene 20 sorbitan monooleate) (commercially available ICI Americas Inc. of Wilmington, Del.), ethoxylated monodiglycerides or mixtures thereof such as those sold under the brand designation Mazol 80 MGK (commercially available from Mazer Chemical, Inc. of Gurnee, Ill.), sorbitan trioleate (commercially available from ICI Americas Inc. under the brand designation Span 85), and lecithin. An especially preferred surfactant is a mixture of ethoxylated monodiglycerides such as Mazol 80 MGK. Some surfactants are also known to act as anti-pleat lock agents e.g. lecithin and Tween 80.

Suitable amounts of a surfactant, such as a mixture of ethoxylated monodiglycerides (Mazol 80), may be present on the inner surface of the casing in order to wet the casing surface and assist in dispersing the anti-pleat lock agent, especially oils, and to emulsify and/or stabilize peeling aid compositions which contain components of varying solubilities. Suitable amounts of a surfactant may range from about 0.005 to about 0.06 mg/in$^2$ (0.0008–0.0009 mg/cm$^2$) and preferably for a surfactant of ethoxylated monodiglycerides such as Mazol 80 from about 0.01 to 0.02 mg/in$^2$ (0.002–0.003 mg/cm$^2$). Too little surfactant may lead to an uneven distribution of the coating composition on the casing surface and with increased surfactant any additional benefits are believed to be reduced in significance relative to the added cost or possible deleterious effect on shirred stick properties such as coherency, deshirring forces and straightness of the shirred stick.

U.S. Pat. No. 3,898,348 describes the coating of internal surfaces of cellulose sausage casings with a homogeneous mixture of a water-soluble cellulose ether and an additive selected from animal, vegetable, mineral and silicon oils and alkylene oxide adducts of partial fatty acid esters. The coating may be applied to the casing surface in a composition such that the additive is present in a proportion of about 0.1 times the weight of the water soluble cellulose ether and up to about 0.5 milligrams per square inch of casing surface. Such mixtures have excellent meat release characteristics and can also effectively protect the casing from "pinholing" failures occasioned by pleat locking. Easy peeling casings utilizing the release coating have found broad commercial acceptance and are presently in use in casings throughout the world.

U.S. Pat. No. 4,137,947 to Bridgeford discloses a method of improving the meat release (peelability) of cellulose sausage casings by the application of a meat release coating to the internal surface thereof. The coating comprises a homogeneous admixture of a water-soluble cellulose ether, the partial fatty acid ester of sorbitan or mannitan and a water-soluble polyalkylene ether of the type $R(-OC_2H_4O)_n-H$ wherein R represents long chain alkyl radicals having 8 to 16 carbon atoms and n is an integer from 4 to 40. An aqueous coating composition containing the water-soluble cellulose ether, partial fatty acid ester and polyalkylene ether is typically applied to the interior of the sausage casing prior to shirring.

Japanese Patent Application Publication No. 55141(1984) discloses easy peeling coatings which produce casings which are easily deshirred without blocking. These coatings comprise a water-soluble cellulose ether such as carboxymethyl cellulose and a phospholipid such as lecithin, phosphatidyl choline, phosphatidyl ethanolamine or phosphatidyl inositol. An aqueous coating of the above two components may be used, preferably with an oil and/or a polyol such as glycerin or propylene glycol.

European Patent Document No. 502,431 discloses peeling aid coatings comprising mixtures of lecithin with alginate, chitosan and/or casein.

Additionally, European Patent Document No. 468,284 discloses peeling aid coatings comprising a water soluble cellulose ether and a dextrin and optionally lecithin.

All of these foregoing peeling aids may be usefully employed on casings of the present invention.

According to the present invention olefinic oxide polymer may be incorporated with cellulose while the cellulose or a cellulose derivative is dissolved in a solvent. The olefinic oxide polymer, such as polyethylene oxide may be added to the cellulose starting material prior to dissolution, but may also conveniently be added e.g. as an aqueous solution to the dissolved cellulose or cellulose derivative prior to extrusion. This incorporation of the olefin oxide polymer is typically throughout the entire cellulose article if the article is a monolayer film, or throughout at least one layer if the article is a multilayer structure such as may be made by merging a plurality of flows of a dissolved cellulose or cellulose derivative (such as viscose) prior to solidification of the cellulosic material (by such means as is known in the art e.g. coagulation, regeneration or precipitation). When merged flows of dissolved cellulosic material are extruded, for example as for coating an inside and outside surface of a paper tube in the manufacture of fiber reinforced cellulose casing or for making nonfibrous multilayer articles, at least one of the layers (preferably the inner surface layer) will have an olefinic oxide polymer such as poly(ethylene oxide) uniformly dispersed therein. Means for producing such articles having multiple coats or layers are disclosed e.g. in U.S. Pat. Nos. 3,661,621; 3,709,720 and 2,141,776 which patents are hereby incorporated by reference.

The amount of olefin oxide polymer such as PEO which is incorporated into the cellulosic article may vary over a wide range; though only small quantities are actually required. In general, cellulosic articles of the present invention such as seamless tubular food casings are formed by addition of at least about 0.5% of olefin oxide polymer based upon the bone dry weight of the cellulose article.

In the manufacture of nonfibrous regenerated cellulose casings by the viscose process, typically viscose is extruded through an annular die into a coagulating and regenerating bath to produce a tube of regenerated cellulose. This tube is subsequently washed, plasticized e.g. with glycerine, and dried e.g. by inflation under substantial air pressure. After drying, the casing is wound on reels and subsequently may be shirred. Fibrous casing employs a similar process of manufacture. However, the viscose is coated on one or more sides of a tube which is generally formed by folding a web of paper so that the opposing side edges overlap. The viscose impregnates the paper tube where the viscose is subsequently coagulated and regenerated to produce a fiber-reinforced tube of regenerated cellulose.

Referring by way of example to use of the viscose process in the present invention, the olefinic oxide polymer may be added to the sheet cellulose e.g. as a powder or in granular form, or may be added later e.g. during the steeping, shredding or aging steps. It may also be added to the xanthated cellulose or the dissolved cellulose xanthate (viscose). Additions of the olefinic oxide polymer prior to viscose formation may be advantageously employed to promote uniformity of incorporation, and allow introduction of greater amounts of oxide polymer without undesirable dilution. It is believed that addition of the oxide polymer to the cellulose xanthate prior to viscose formation may allow the greatest flexibility in processing. For example, the oxide polymer may be added with aqueous sodium hydroxide and cellulose xanthate to the vissolver (a vessel for dissolving cellulose xanthate) to form viscose. Amounts of oxide polymer may easily be adjusted to desired levels and the vissolving process allows for adequate mixing to assure uniformity of incorporation of the oxide polymer in the viscose. Also, the oxide polymer may be introduced to the formed viscose prior to extrusion by forming an aqueous solution of oxide polymer and metering the solution into the viscose with appropriate mixing to assure a uniform product. The above is further illustrated in the drawings.

Referring now to FIG. 1, cellulose starting material in the form of sheets of pulp 10 and an aqueous solution of sodium hydroxide 11 are brought into contact in a steeping bath 12 to convert the cellulose to alkali cellulose. As noted above, typically high quality cellulose pulp having a density between about 0.8–0.9 g/cm$^3$ is used with a 17–20 weight percent aqueous solution of sodium hydroxide. Cellulose is held in the steeping bath for about 50–60 minutes at a bath temperature of about 19°–30° C. The steeping bath is drained and the alkali cellulose pressed as described in further detail above. The pressed alkali cellulose is transferred to shredding means such as a temperature controlled mechanical shredder 14 where the alkali cellulose fibers are pulled apart. The shredded alkali cellulose is aged for a suitable time to produce the desired degree of polymerization and then transferred to a baratte 16 to which CS$_2$ is added to convert the alpha cellulose to cellulose xanthate. The cellulose xanthate 18 is then transferred to a vissolver 19 with addition of aqueous sodium hydroxide 20 and the temperature is controlled and mixture agitated to place the cellulose xanthate into solution thereby forming viscose. The formed viscose 21 is allowed to ripen to achieve the desired xanthation, deaerated, filtered and conveyed via pumping means such as a viscose pump 22 and transfer means such as pipe 23 to mixing means such as a static mixer 24. An olefinic oxide polymer 25 such as poly(ethylene oxide) may be added as a metered solution to the static mixer 24 which contains a series of baffles to facilitate mixing of the olefinic oxide polymer 25 and viscose 21. The viscose 21 and poly(ethylene oxide) 25 are preferably uniformly mixed to produce a homogeneous solution which is transferred by transfer means 26 such as a pipe to an extrusion die or nozzle 27 which immediately opens into coagulation and regeneration means such as a tank hereinafter referred to as an aquarium 28 containing an acid such as sulfuric acid which initiates and causes coagulation and regeneration thereby forming a shaped article. The aquarium may also contain agents to modify the rate of regeneration, such as metal salts, as is well known in the art. It will be appreciated that various forms of dies known in the art may be used. In fiber manufacture, the die 27 comprises spinnerets. In tubular film manufacture, such as for sausage casing, the die has an annular opening. For production of flat film or sheets the die may be a slot. Also, coextrusion dies may be employed as well as dies for coating opposing sides of a cellulose or plastic paper substrate.

Optionally, a fiber web of e.g. paper 29 may be admitted to die 27 where the viscose is extruded onto the paper before it enters the aquarium. Different dies are used for production of nonfibrous and fibrous casing and suitable dies are well known in the art. In the production of fiber-reinforced sausage casings the paper is shaped into a tube prior to coating with viscose. The viscose is allowed to penetrate the paper prior to admittance to the aquarium and penetration time may be adjusted by modifying the distance between the die and aquarium and/or adjusting the travel speed of the article.

Optionally, the olefinic oxide polymer may be added to the cellulose, cellulosic solution or cellulose derivative at any point prior to the extrusion or shape forming step as long as the poly(ethylene oxide) becomes sufficiently mixed to produce a homogeneous mixture at extrusion. It should be clearly understood that such addition of olefinic oxide polymer may be made at various points prior to extrusion regardless of the process utilized to create an extrudable cellulose or extrudable cellulose derivative including the aforementioned cuprammonium, N-methyl-morpholine-n-oxide, zinc chloride, and cellulose carbamate processes as well as the well known viscose process which is presented here as a preferred example of the applicable processes. Referring again to FIG. 1 of the drawings, the poly(ethylene oxide) 25 is preferably added as an aqueous solution to the viscose via a static mixer 24. However, the olefinic oxide polymer 25 may also be added as a powder or in solution to the pulp sheets 10 or aqueous sodium hydroxide 11 prior to or during steeping. It may also be added prior to or during shredding as well as prior to or in the baratte or vissolver. It is believed that addition prior to viscose formation, particularly to the vissolver by addition to the sodium hydroxide, may provide certain advantages of cost and efficiency. For example, by adding the polymer additive to the vissolver, mixing may be performed in existing equipment without requiring a separate mixer such as the static mixer.

Extrusion of viscose through die 27 into the aquarium 28 produces a partially coagulated and regenerated cellulosic article which is conveyed by transfer means 30 to additional acid regeneration means 31 such as one or more consecutive tubs of acid. The regenerated cellulosic article, by way of example, may be a tube which is then conveyed by transfer means 32 to washing means 33 such as one or more consecutive tubs of water which may also contain additives such as caustic e.g. to adjust pH and facilitate removal of sulfer by-products. The washed article of regenerated cellulose is conveyed by transfer means 34 to drying means 35. Optionally, the article may be conveyed by transfer means 34a to plasticizing means 36 such as one or more tubs containing a suitable plasticizing agent, for example, an aqueous solution of one or more polyols such as glycerine and from the plasticizer means 36, the article may be conveyed via transfer means 37 to the drying means 35. Drying means 35 may be humidity controlled hot air dryers where the moisture content of the formed article such as a tube of cellulosic casing is adjusted. One of the advantages of the present invention is that the plasticizing means 36 (commonly a tub containing 5–10% of a polyol such as glycerine in water) is unnecessary and may be omitted. Cellulose films made according to the present invention are sufficiently strong and flexible without requiring any additional polyol or plasticizer. This is a significant advantage in the manufacture of shirred casing. For example, cellulosic sausage casing may be made where the olefinic oxide polymer replaces a portion of the cellulose in the casing yet the resultant casings may have of normal moisture content and be sufficiently flexible and not brittle even though no additional softener or plasticizer has been added. This means that the cost of the glycerine or other plasticizing agent is saved, that the casing weighs less due to omission of the glycerine (thereby saving on shipping costs), and that a thinner casing (thinner because it is uncoated with glycerine) having less mass per unit area may be utilized to produce more compact shirred sticks. Advantageously, either a greater length of casing may be shirred to a set shirred stick length relative to present commercial casing containing glycerine, or an equal casing length may be shirred to a shorter shirred stick length.

Referring again to the drawings, the dried, moisture adjusted casing is conveyed via transfer means 38 to collection means 39 such as a take-up reel or shirring operation. Typical transfer means 30, 32, 34, 37 and 38 may each comprise one or more rollers.

The present invention is particularly beneficial in the production of novel shirred sticks of tubular casing. Shirring techniques for the casings described herein generally involve the continuous feeding of a length of flat casing feed stock, from a reel for instance, into a shirring machine where the casing is inflated with low pressure gas, usually air. The inflated casing is passed through an array of shirring rolls which pleat the casing up against a restraint on or about the shirring mandrel until a preselected shirred length has been attained. For a floating mandrel type of shirring machine, such as described in U.S. Pat. No. 3,766,603 for example, the shirred casing is then transferred linearly past or away from the restraint against which the shirring was performed and onto an extended mandrel portion wherein it is compacted into a desired stick length. For a withdrawing mandrel shirring machine such as described in U.S. Pat. No. 2,583,654 for example, the shirring mandrel with the shirred casing remaining thereon is rotated to an alternate position where the shirred casing is compacted into a desired stick length.

The normal compaction results in a stick length which may be from about 0.8 percent to about 1.2 or 1.3 percent of the original casing length.

The ratios of original casing length to shirred stick length, referred to as "pack ratio", have been generally on the order of 70 to 125 throughout the industry, prior to the time of the present invention.

Packing efficiency is another way of quantitatively expressing the extent to which original casing lengths are compacted in the shirred stick form. Packing efficiency is defined as the ratio of the volume of the shirred and compacted casing in a unit length divided by the volume of the same unit length which would be occupied by solid casing material, and it may be determined by the following relationship:

$$PE = \frac{Lc \times (2 \times FW \times tc)}{\frac{\pi}{4}(OD^2 - ID^2) \times Ls}$$

where
PE = Packing Efficiency
Lc = casing length
Ls = shirred casing stick length
FW = casing flat width
tc = casing wall thickness
OD = shirred casing stick outer diameter
ID = shirred casing stick inner diameter This computation automatically takes into account the specific gravity, and/or density of the casing material itself. Inspection of the relationship shows that the ratio is actually the volume of the casing flat stock which is contained in the shirred casing stick, divided by the volume of a hollow cylinder having the same dimensions as the shirred casing stick. The extent to which packing efficiency increases is thus measuredly the closeness of its approach towards one (1), unity.

Since pack ratio is the ratio of Lc to Ls, another way to express the packing efficiency relationship is as follows:

$$PE = (\text{Pack Ratio}) \frac{2 \times FW \times tc}{\frac{\pi}{4}(OD^2 - ID^2)}$$

It can be seen that for a given packing efficiency, the pack ratio varies with the difference between the outside diameter and the inside diameter of the stick of a given size casing. Further, since the outside diameter is necessarily limitedly the flat width (FW) of the casing used to form the stick, increasing the diameter difference to increase the pack ratio must decrease ultimately the size of the bore or inside diameter. While the objectives of maximum stick bore and maximum pack ratio work against each other, the fact remains that packing efficiency is maximized at a given pack ratio when the stick inside diameter is maximized.

It is usually desirable to utilize the maximum bore size (internal cross sectional area) stuffing horn with a given casing size, in part to maximize throughput and minimize stuffing pressure. Another reason to maximize the horn size is to eliminate the danger of "fatting out". Fatting out is a phenomenon which arises when the passage of the meat emulsion through a stuffing horn at a high shear rate causes the emulsion to break down and allows water and fat to separate out. The water and fat thereafter accumulate between the surface of the finished sausage product and the cellulosic food casing during processing, to thereby produce an unsatisfactory sausage product having an unacceptable visual appearance. The shear rate decreases with increasing stuffing horn inner diameter.

The goals that have been sought in shirring technology have been to produce a casing stick which can be deshirred and stuffed on a stuffing apparatus, continuously, with no mechanical defects or breakdowns so as to insure continuous production, the stick itself having sufficient structural and mechanical integrity, i.e. coherency, to withstand the ordinary rigors of packaging, storage, handling and placement on the stuffing apparatus, and, in addition, the desideratum of compacting as much stuffable casing into a given stick length as is technically feasible for use on a stuffing horn of maximum possible bore size.

Accordingly, the "ideal" casing stick is one of high coherency, balancing a long length of casing per unit stick length (high pack ratio) and a large inner diameter or bore size (high packing efficiency).

An important factor affecting the suitability of shirred casing sticks for use with automatic food stuffing equipment, for example employed in the preparation of products such as frankfurters, is the durability or coherency of the shirred stick as a self-sustaining article. A disjoinder or break in the shirred stick prior to mounting on the stuffing apparatus may make the stick unsuitable for use. Accordingly, any modification to a tubular food casing that is to be formed into shirred casing sticks must be considered in light of its effect on coherency. Advantageously, shirred sticks of casing made according to the present invention have sufficient coherency to hold together from immediately after shirring through shipping and ultimate use, while allowing the shirred casing to be easily deshirred during stuffing operations without production of casing defects such as holes or tearing and without requiring undue force thereby minimizing such defects.

Following is a description of the coherency test that is used for determining this important characteristic of shirred casing sticks of the present invention.

COHERENCY TEST METHOD

Coherency (COH) of a casing stick is determined by measuring the bending moment in inch-pounds at the breaking of a stick. A casing stick is cradled on two V-notched support brackets secured on a base plate and spaced apart a distance (D) about 80% to 90% of the length of the casing stick being tested. A pressure member having V-notched struts spaced apart a distance of D less 4 inches is centrally lowered onto the top of the casing stick. A downward pressure is provided by lowering a force gauge (such as Chatillon Digital Force Gauge, Model DFG-10 with a "Hold at Maximum Device"), that is secured centrally to the pressure member at a constant velocity of about 8½ inches per minute. The force is increasingly applied until the casing stick breaks. The maximum force reading P in pounds is noted. The bending moment in inch pounds at break on the apparatus is equal to $P/2 \times 2$ inches, and thus the force reading P equates to inch-pounds of bending moment to break the casing stick. In general, a coherency of at least about 1.0 inch-pound (1.2 cmKg) is required to provide shirred sticks of sufficient integrity to survive normal packaging and handling operations from the time of shirring until use on a stuffing machine, a coherency of at least about 2.0 inch-pounds (2.3 cmKg) is desirable, and at least 2.5 inch-pounds (2.9 cmKg) is especially suitable and preferably at least 3.0 inch-pounds (3.5 cmKg) is achieved.

Since the relationship of usable casing stick bore diameter with respect to stuffing horn diameter is a most meaningful measure of casing article functionality, a "drop fit" (also termed "horn fit") test has been developed for use with shirred casing articles. To simulate the placing of a shirred stick on a stuffing horn and thereby measure the effective internal diameter of the shirred stick, a test was designed wherein a shirred stick is placed over the upper end of a vertical stainless steel rod of longer length than the shirred stick and allowed to freely fall under its own weight completely around said rod to its lower end. More particularly, the rod may be vertically positioned on a table. The shirred stick is placed over the rod upper end and then released. If the stick falls to the table surface, the drop fit test is successful. Rods are available in diameter increments of 0.010 inches, and for certain casing size ranges, rods have been fabricated in 0.002 inch increments. The shirred stick is tested on each rod beginning with the smallest rod and on each succeeding size rod until the shirred stick will not freely fall over the entire length of the rod. The largest diameter rod over which the stick freely falls for its entire length is the effective internal diameter of said shirred stick, i.e., the "drop fit" or "horn fit" diameter.

In the manufacture of shirred cellulosic casing sticks, the individual sticks vary slightly in bore size, in part due to irregularities in extensions of pleats within the stick bore. For this reason, for experimental work, it is necessary that multiple shirred sticks, be measured for drop fit and the arithmetic average used to determine functionality of the entire group in terms of the stuffing horn fit. Unless indicated otherwise, the reported value for drop fit (horn fit) is an average for 10 sticks. As previously indicated, drop fit averages are preferably to the thousandth of an inch, and a drop fit requirement is defined to this degree of accuracy. For example, if the requirement is 0.490 inch minimum, an average drop fit of 0.489 inch would be unacceptable, since a significant number of sticks in the group represented by the 0.489 inch average drop fit measurement would not be functional on a 0.490 inch diameter stuffing horn.

Another factor that is important in affecting the suitability of shirred casing sticks for use with automatic food stuffing equipment is the deshirring force required to deshirr the casing. If the required deshirring force is excessive, tearing of casing will result during deshirring. A deshirring force test, as described below, was employed in evaluating the coated casings of the present invention.

Deshirring Force Test

This test was used to determine the force required to deshirr a selected stick of casing in the direction in which it would be stuffed. The apparatus used consists of a force gauge (Model DFG-2, Chatillon Digital Force Gauge, measuring from 0 to 2 pounds in 0.001 lb. increments) and a pulley with an attached reeling device which is used to pull and deshirr the casing from the shirred stick. Using this equipment, a casing stick is pulled and deshirred at a constant speed of about 60 inches per minute.

The test procedure for the deshirring force tests consists of the following steps:
  (a) From the selected shirred stick, an approximately 2 inch (3 cm) sample is removed from the open end, the middle, and the closed end of the stick.
  (b) The closed end disposed portion of each stick sample is deshirred by hand approximately 1 inch (2.5 cm). Then the open end disposed portion (cone portion) of each stick is wrapped with adhesive tape to ensure that the casing will not deshirr at that cone position and to provide a tab for clamping.
  (c) The deshirred portion of the stick is clamped to the force gauge using a spring clamp which is attached to the gauge. The other (taped) end of the stick is clamped to the reeling device attached to the pulley.
  (d) The reeling device and pulley mechanism is started and the casing deshirring begins. A chart recorder continuously records measurements of the deshirring force on the force gauge. The minimum values obtained for each section of the shirred stick are averaged as are the maximum values and the test is repeated with two additional sticks of casing. The nine minimum values obtained are averaged to provide the average minimum deshirr force. Also, the nine maximum values measured are averaged and reported as the maximum deshirr force.

The maximum deshirr force is an indication of the likelihood of failure of a shirred stick during stuffing operations. High speed deshirring upon stuffing with automatic stuffing equipment is likely to cause tears, breakage or pinholes in casing exhibiting excessively high deshirr forces.

Actual deshirr force values of casing will vary depending upon such well known parameters as casing diameter and type and size of shirring pleats, as well as the presence, type and amount of any coating on the casing.

The invention will become more clear when considered together with the following examples which are set forth as being merely illustrative of the invention and which are not intended, in any manner, to be limitative thereof. Unless otherwise indicated, all parts and percentages are by weight. Also, when mixtures are said to be completely dissolved, such description is based upon a visual examination of the solution by eye. Casing flatwidth is the width of a tubular casing which has been pressed flat. The circumference of a tubular casing is equal to two times the flat width.

Unless otherwise noted, the physical properties reported in the examples below were measured by either the test procedures described above or tests similar to the following methods.

Bone Dry Gauge (BDG)

Bone dry gauge is the weight per unit length of cellulose film or casing for a known width of casing which has been washed in water to remove water leachable constituents and then dried at elevated temperatures to remove moisture. For a given flatwidth of casing Bone dry gauge is the weight per unit length of bone dry cellulose plus any constituent which is not leached out by washing in water. Such nonleachable constituents are considered to be fixed in the cellulosic structure of the film or casing.

Determination of Bone Dry Gauge is made by cutting a sample 40 inches in length of a determined width. In all of the examples herein BDG for nonfibrous casing was determined using two pieces of casing each being 20 inches (50.8 cm) long. BDG for fibrous casing was determined using a single 10 inch (25.4 cm) long piece of casing.

Each tubular casing sample is slit lengthwise to produce a sheet of film which is then placed in a wash rack and washed for 1 hour using countercurrent washing to remove any water leachable constituents from the casing.

After washing for 1 hour the casing is subsequently placed in a beaker and dried in a convection oven set at a temperature of about 110° C. for at least about 1 hour to drive off moisture. The beaker containing the dried samples is removed from the oven and placed in a dessicator and allowed to cool to room temperature. The dried, cooled samples are then placed in a tared weighing bottle and the weight of the casing is measured and recorded. The flatwidth of the casing is also recorded. BDG is reported as the dried weight of the casing per unit length for a known flatwidth of casing. Although casing lengths were measured in inches, the data presented in the examples have been converted to metric units.

Burst Stress Test For NonFibrous Film

A sample comprising an approximately 18 inch (46 cm) length of tubular nonfibrous film (casing) is obtained and soaked in room temperature water for at least about 30 minutes. This simulates conditions of use, for example, in sausage processing operations where casings are exposed to moisture and water in a variety of steps. The dry and wet flatwidth of the casing may be measured and recorded. One end of the casing is clamped shut and the other end is secured about an air nozzle. The casing is inflated with air from the nozzle. The diameter of the casing is measured at various pressures as the air pressure inside the inflated casing is continuously increased until the casing ruptures (bursts). The pressure and diameter at the bursting point is noted. A second sample is similarly tested and the average values for both samples are reported.

Burst Stress Test For Fibrous Film

A sample comprising an approximately 30 inch (76 cm) length of tubular fibrous film (casing) is obtained and soaked in room temperature water for at least about 30 minutes. This simulates conditions of use, for example, in sausage processing operations where casings are exposed to moisture and water in a variety of steps. The dry (before soaking) and wet flatwidths of the casing are also measured and recorded. One end of the casing is tied shut and the other end is secured about an air nozzle. The casing is inflated with air from the nozzle. The diameter of the casing is measured at various pressures as the air pressure inside the inflated casing is continuously increased until the casing ruptures (bursts). The pressure and diameter at the bursting point is noted. A second sample is similarly tested and the average values for both samples are reported.

The following ASTM test methods may also be utilized to test materials or properties of the inventive films.

Molecular Weight Distribution: ASTM D-3593
Polyol/glycerine: ASTM-0615

All ASTM test methods noted herein are incorporated by reference into this disclosure.

The above description and following examples are given to illustrate the invention and methods of making the invention, but these examples should not be taken as limiting the scope of the invention to the particular embodiments or parameters demonstrated since obvious modifications of these teachings will be apparent to those skilled in the art.

EXAMPLE A

A 10% by weight aqueous solution of poly(ethylene oxide) (hereinafter PEO) was added to a stream of viscose via a pigmentor apparatus just prior to extrusion.

The PEO-containing viscose was extruded into a seamless tube, coagulated and regenerated according to well known procedures in the art of making regenerated cellulose casings. The tube of regenerated cellulose had a flat width of approximately 3.3 cm. The PEO used in this example was a commercially available powder sold under the trademark POLYOX WSRN-10 by Union Carbide Corporation. The poly(ethylene oxide) was added to the viscose at a rate of about 25 cm$^3$/min. The extruded tube was observed to regenerate faster and by-products washed out faster relative to a similarly processed tube of regenerated cellulose not having PEO. The PEO-containing casing also absorbed more moisture than similarly made casing not having PEO. Also, the dried PEO-containing casing appeared more transparent and glossier than casing made without PEO.

EXAMPLE 1

Example 1 describes preparation of solutions A-F which were utilized in following Examples. Six solutions (A-F) were prepared as follows. In the Examples, all percentages are by weight unless indicated otherwise. All of the POLYOX and PEG resins were commercially supplied in powdered form. POLYOX WSRN-10, POLYOX WSR-1105, POLYOX WSR-301 and PEG 10,000 are all trademarks of Union Carbide Corporation. CORCAT P-600 is a trademark of Cordova Chemical Company. The poly(ethylene oxide), poly(ethylene glycol) and poly(ethyleneimine) aqueous solutions prepared below were all determined by a visual examination to be completely dissolved.

A. A 15% by weight solution of Union Carbide POLYOX WSRN-10, (a 100,000 molecular weight poly(ethylene oxide) homopolymer) was prepared by mixing 90 grams of WSRN-10, in 510 grams of water using a Waring blender. The mixture was blended at high speed for 15 minutes. The resulting solution was foamy but upon sitting gave an opaque solution with no undissolved POLYOX.

B. An 8% by weight solution of Union Carbide POLYOX WSRN-10, (a 100,000 molecular weight poly(ethylene oxide)homopolymer) was prepared by mixing 240 grams of WSRN-10, in 2760 grams of water using a propeller type lab mixer. The solution was mixed until all of the WSRN-10 was in solution (about 3 hours).

C. A 5% by weight solution of Union Carbide POLYOX WSR-1105 (a 900,000 molecular weight poly(ethylene oxide) homopolymer) was prepared by mixing 150 grams of WSR-1105 into 2850 grams of water using a propeller type lab mixer. The solution was mixed until the WSR-1105 was in solution (about 5 hours).

D. A 1% by weight solution of Union Carbide POLYOX WSR-301 (a 4,000,000 molecular weight poly(ethylene oxide) homopolymer) was prepared by heating 2970 grams of water to 60° C. and slowly adding 30 grams of WSR-301 to the heated water using a propeller type of mixer for agitation. The solution was mixed for five hours until the WSR-301 was completely dissolved. The solution was allowed to cool to room temperature prior to use.

E. A 7.5% by weight solution of Union Carbide PEG 10000 (a 10,000 molecular weight poly(ethylene glycol)) was prepared by mixing 225 grams of PEG 10000 into 2775 grams of water using a propeller type lab mixer. The solution was mixed until the PEG 10000 was completely dissolved.

F. A 7.5% by weight solution of poly(ethyleneimine) was produced by mixing 775 grams of Cordova Chemical Company CORCAT P-600 (a 40,000 to 60,000 molecular weight poly(ethyleneimine) which is commercially available as an aqueous solution containing 33% solids) into 2225 grams of water using a propeller type lab mixer. The solution was mixed for one hour until the CORCAT P-600 was completely dissolved.

G. A 2% by weight solution of Union Carbide POLYOX WSR-301 (a 4,000,000 molecular weight poly(ethylene oxide) homopolymer) was prepared by heating 2940 grams of water to 60° C. and slowly adding 60 grams of WSR-301 to the heated water using a propeller type mixer for agitation. The solution was mixed for five hours until the WSR-301 was completely dissolved. The solution was allowed to cool to room temperature prior to use.

EXAMPLE 2A-2F

A non-fibrous cellulosic casing was produced by a typical viscose process modified to include a static mixer in line between the viscose pump and the nozzle. The static mixer was an approximately 18 inch (46 cm) long pipe of one inch (2.54 cm) inner diameter with an inlet nozzle on one end of the outside wall that allows a second liquid to be introduced into it. The inside of the pipe contains a series of horizontal and vertical baffle rings which form a criss-cross pattern through the pipe which facilitates mixing of the two liquids as they travel from an entrance end of the pipe to the common exit at the opposing end of the pipe.

As viscose flows through the pipe, a second liquid is admitted and uniformly mixed into the viscose by dividing and redividing the viscose and solution additive as they pass through the baffles. The viscose and added liquid form a homogeneous solution that is then extruded through a nozzle and regenerated in the usual manner. This viscose process utilized starting materials and process conditions believed to produce a regenerated cellulose having a weight average molecular weight (Mw) of over 100,000. Typical fibrous and non-fibrous casings are commercially made with regenerated cellulose having a Mw of from about 80,000 to 150,000.

An aqueous solution of polyethylene oxide (PEO) made substantially as described for Solution A in Example 1 was continuously added to a viscose stream via a static mixer as described above. The flow ratios of the viscose and Solution A were adjusted to provide films having cellulose and polyethylene oxide contents as indicated in Table 1. Examples 2A and 2D are control examples (not of the invention) in which no solution additive was introduced. The viscose flow was the same rate for Examples 2A and 2B, but was reduced 5% for Example 2C relative to Examples 2A and 2B. The viscose flow was reduced 10% for Examples 2D and 2E relative to Example 2A. The viscose flow for Examples 2D and 2E was the same.

Example 2F is a control example for comparative Example 2G (not of the invention) in which an aqueous solution of poly(ethylene glycol) made substantially as described for Solution E in Example 1 was continuously added to a viscose stream via a static mixer in a manner similar to that described above for addition of PEO. The flow ratios of the viscose and Solution E were adjusted to provide film having the cellulose and poly(ethylene glycol) content indicated in Table 1. In control Example 2F (not of the invention) no solution additive was introduced.

is regenerated from the viscose and that the washed casing is substantially pure cellulose. For these control examples, the BDG is equal to the Bone Dry Cellulose weight. For Examples 2B, 2C and 2E and comparative Example 2G the BDG includes both the weight of the cellulose and the weight of the polymer additive incorporated in the cellulose. The amount of polymer additive retained in the cellulose casing after washing with water was calculated as the difference in the values for BDG and calculated cellulose content. This value is further reported as the percentage of polymer additive retained in the cellulose. The viscose flow was unchanged between Examples 2A and 2B and also between Examples 2D and 2E giving rise to the calculated cellulose content for Examples 2B and 2E. The viscose flow for Example 2C was 95% of that for 2A. Similarly the viscose flow for Example 2G was 95% of that for Example 2F giving rise to the calculated values reported in Table 1. As demonstrated by the data presented, a much greater percentage by weight (30%) of the low molecular weight PEG does not remain as part of the casing relative to the higher molecular weight poly(ethylene oxide) (12–20%). This example demonstrates that when materials such as water soluble PEG having a substantially lower average molecular weight than the cellulose are added prior to extrusion, a substantial proportion of the water soluble low molecular weight material is not securely connected or incorporated with the cellulose, but is easily removed by washing with water. In contrast, higher molecular weight olefinic oxide polymers such as poly(ethylene oxide) having an average molecular weight of 100,000 are substantially incorporated or securely connected to the

TABLE 1

| Example No. | Solution Additive Type of Polymer | Flatwidth cm | Weight Ratio of Cellulose to Polymer Additive | Polymer Additive mg/cm Calc. add. | Polymer Additive mg/cm Calc. ret. | Cellulose % Polymer Additive mg/cm measured*** | Cellulose Content mg/cm Calculated | Polymer Additive Retained in Cellulose % |
|---|---|---|---|---|---|---|---|---|
| 2A | — | 2.74 | 100:0 | — | — | 13.48 | — | — |
| 2B | PEO* | 2.79 | 100:10 | 1.49 | 1.19 | 14.67 | 13.48 | 80 |
| 2C | PEO* | 2.79 | 95:15 | 2.23 | 1.90 | 14.71 | 12.81 | 85 |
| 2D | — | 2.79 | 100:0 | — | — | 12.11 | — | — |
| 2E | PEO* | 2.84 | 100:20 | 2.97 | 2.60 | 14.71 | 12.11 | 88 |
| 2F | — | 3.40 | 100:0 | — | — | 19.24 | — | — |
| 2G | PEG** | 3.40 | 95:5 | 0.96 | 0.67 | 18.95 | 18.28 | 70 |

*Poly(ethylene oxide) commercially available from Union Carbide Corp. under the trademark Polyox WSRN-10 having a reported average molecular weight of 100,000.
**Polyethylene glycol commercially available from Union Carbide Corp. under the trademark PEG 10000 having a reported average molecular weight of 10,000.
***Measured as Bone Dry Gauge (BDG) of casing.

Referring to Table 1, Examples 2A, 2D and 2F were control examples (not of the invention). These control examples were seamless, nonfibrous tubular films of regenerated cellulose which were formed, plasticized with glycerine and moisturized to produce an article suitable for use as a sausage casing. In examples 2B, 2C and 2E of the invention poly(ethylene oxide) having a reported average molecular weight of 100,000 was added as a 15% aqueous solution. The flow rates of the aqueous solution of polymer additive and viscose were adjusted to yield the indicated weight ratio of cellulose to polymer additive. The values of poly(ethylene oxide) and poly(ethylene glycol) reported in Table 1 as "Polymer Additive calculated as added" were calculated using the known solutions from Example 1 and flow rates. The Bone Dry Gauge (BDG) was measured by a method similar to that described above. For control Examples 2A, 2D and 2F it is known that in the viscose process which was used substantially all of the cellulose cellulose and not easily removed by washing with water. It is believed that materials such as olefinic oxide polymers which have average molecular weights substantially less than the average molecular weight of the cellulose in the desired cellulosic article tend to leach or wash out to an undesirably large extent. In this example, the cellulose was believed to have an average molecular weight (Mw) of between about 100,000–120,000, the PEG had a reported Mw of about 10,000 and the PEO had a reported Mw of about 100,000. Substantial amounts of the water soluble PEG were easily washed out by water whereas unsubstantial or minor amounts of the water-soluble PEO were removed by washing. It is believed without wishing to be bound by that belief that leaching out of high amounts of polymer may lessen or impair the strength of the article produced, especially film articles. For many useful articles of the invention it is believed to be desirable that the amount of olefinic oxide polymer retained or incorporated in the cellulosic films made from viscose containing PEG and the results are summarized in Table 2 below.

TABLE 2

| Example No. | Type of Polymer Additive | Weight Ratio of Cellulose to Polymer Additive | Weight of Viscose & Additive (g) | Weight of Acid Bath (g) | Polymer Additive Detected by IR |
|---|---|---|---|---|---|
| 3A | PEO* | 83:17 | 105.9 | 500.0 | NO |
| 3B | PEG** | 65:35 | 96.8 | 500.0 | YES |
| 3C | PEG** | 98:2 | 303.0 | 1000.0 | YES |

*Poly(ethylene oxide) commercially available from Union Carbide Corp. under the trademark Polyox WSRN-10 having a reported average molecular weight of 100,000.
**Polyethylene glycol commercially available from Union Carbide Corp. under the trademark PEG 10000 having a reported average molecular weight of 10,000.

article be greater than that exhibited by comparative Example 2G, preferably at least about 75% and more preferably at least about 80% or more will be incorporated and not easily washed out by contact with water or the typical aqueous washing solutions which are well known and utilized in casing manufacture such as in the viscose process. It is believed that water soluble olefinic oxide polymers such as poly(ethylene oxide) having average molecular weights of at least about 70,000 may be usefully employed in various embodiments of the invention.

EXAMPLES 3A–3C

Laboratory film samples of regenerated cellulose containing poly(ethylene oxide) and poly(ethylene glycol) were prepared from viscose and tested for leaching of the PEO and PEG. The PEO and PEG polymer additives were prepared as described above in Example 1 for solutions B and E respectively. The viscose was similar to that described above in Example 2. Cast films were made by uniformly mixing a measured amount of each solution additive with viscose and drawing down the viscose/additive mixture on a glass plate using a Bird applicator such as that described in U.S. Pat. No. 2,151,183 having a 20 mil gap between the surfaces of the glass and the spreading edge of the applicator. For each Example 3A–3C, the glass plate (coated with an approximately 20 mil thick layer of viscose) was set into a coagulation/regeneration bath comprising an aqueous solution of sulfuric acid (13.1%) and sodium sulfate (25.5%).

The viscose was allowed to coagulate for about 3 minutes and then the glass plate and the regenerated cellulosic film were removed from the bath. About 10 to 15 cast films were made for each of the Examples 3A–3C reported in Table 2. The regeneration bath was changed for each Example 3A–3C, but all films made for a particular example used the same single bath. Thus, for Example 3A about 10–15 cast films containing 17% poly(ethylene oxide) and 83% cellulose were regenerated in acidic regeneration bath. The weights of the acid bath solution employed and the total weight of the viscose (including polymer additives) which was regenerated are reported in Table 2. Following regeneration of the film, the acid bath was transferred to the interior of a tubular dialysis casing of regenerated cellulose and dialyzed by placing the acid bath-containing casing into a water filled vessel to which fresh water was continuously added. The dialysis was allowed to proceed for at least 48 hours and the dialyzed regeneration bath was then removed from the casing, concentrated by evaporation and analyzed by Infra-red spectroscopy to determine if any of the polymer additive PEO was present. This procedure was repeated for films made from viscose containing PEG and the results are summarized in Table 2 below.

The inclusion of poly(ethylene oxide) in the final film composite is further reinforced by laboratory work which show poly(ethylene glycol) present in the acid regeneration bath used to regenerate the viscose (having added PEG), whereas no poly(ethylene oxide) was detected in the acid regeneration bath used to regenerate those casings (having added PEG).

Infra-red (IR) spectra were obtained for the dialyzed acid baths in Examples 3A–3C and compared to control samples which included solutions of PEO dissolved in regeneration acid bath and PEG dissolved in regeneration acid bath. The PEO control comprised a 1.3% solution of PEO in bath, and the PEG control comprised a 3.3% solution of PEG in bath. These controls were similarly dialyzed and concentrated as described above for Examples 3A–3C prior to IR analysis. The dialyzing step was performed to remove the acid and sulfate components of the acid bath while retaining any PEG or PEO that had been washed out or leached out of the film into the bath during the coagulation/regeneration step. Also controls of PEO in water and PEG in water were run at 8% (PEO) and at 0.1%, 0.5%, 1%, 10%, and 20% (PEG). Comparison of the dialyzed, concentrated regeneration baths of Examples 3A–3C to the controls clearly indicated that PEG which was added to the viscose washed out of the cellulose film. PEG residue was detected in the bath for films having both high levels of addition (35% in Example 3B) and low levels of addition (2% in Example 3C), whereas PEO was not detected in its regeneration bath as seen in Example 3A (17% level of addition). Example 3 further demonstrates that olefinic oxide polymers such as poly(ethylene oxide) having a relatively high weight average molecular weight tend to remain incorporated in cellulose films formed from extrudable cellulose or cellulose derivatives to which the polymer has been added, while low molecular weight polymers such as polyethylene glycol having a reported Mw of about 10,000 tend to leach or wash out of the film. This IR method of analysis is believed to be more accurate than the calculated and measured weight method of the previous example. Preferably, films of the present invention will be substantially not leachable with greater than 98% of the olefin oxide polymer incorporated and not easily washed out by contact with water or the typical aqueous washing solution when applied to semifinished casing which has previously been dried down and then remoisturized as described above.

EXAMPLES 4–9

A series of seamless tubular cellulose films were produced via the viscose process described above. These films incorporated various amounts of the polymer additives: poly(ethylene oxide) (PEO), poly(ethylene glycol) (PEG) and poly(ethyleneimine)(PEI) from solutions similar to B-G of Example 1. The tubular nonfibrous films designated Examples 4-9 (Control and Samples A-C) were similarly made according to procedures described above, but differed in the amount and type of polymer additive which was introduced prior to extrusion. Unless noted otherwise, the weight ratio of cellulose to additive was 99 to 1 based upon Bone Dry Gauge for all of the Examples 4A-9A. Similarly Examples 4B-9B had a weight ratio of 98 to 2 (BDG) and Examples 4C-6C had a weight ratio of 95 to 5. Unless otherwise noted for each example, control films were also made from the same viscose supply without any polymer additive.

Film properties including burst pressure and diameter at burst were measured and results are reported in Tables 3A-3B.

For each example the same viscose supply was utilized for both the polymer additive containing film and the control film which was made without any additive. The control films were plasticized by dipping in glycerine and were substantially similar to seamless, tubular, nonfibrous, regenerated cellulose casing used commercially in the manufacture of small diameter skinless sausages. The weight average molecular weight (Mw) of the cellulose in the films produced is believed to have been between about 95,000 to 120,000 and all of the films produced are believed to have had a similar Mw. Molecular weight distribution may be determined by the well known method of gel permeation chromatography (GPC). Examples 4A and 5A are comparative examples (not of the invention).

The films were all extruded to a similar flatwidth between about 3-3.5 cm. The values report in Table 3B for burst pressure and at burst diameter are averages of two measurements.

TABLE 3A

| | | Film with Polymer Additive | | | | | |
| Example No. | Control Film Type | Sol. I.D. | Additive Type | Molecular Weight | Ratio Cellulose: Additive | | |
| | | | | | Sample A | Sample B | Sample C |
|---|---|---|---|---|---|---|---|
| 4 | 100% Cellulose | E | PEG* | 10,000 | 99:1 | 98:2 | 95:5 |
| 5 | 100% Cellulose | F | PEI** | 50,000 | 99:1 | 98:2 | 95:5 |
| 6 | 100% Cellulose | B | PEO*** | 100,000 | 99:1 | 98:2 | 95:5 |
| 7 | 100% Cellulose | C | PEO**** | 900,000 | 99:1 | 98:2 | — |
| 8 | 100% Cellulose | D | PEO***** | 4,000,000 | 99:1 | 98:2 | — |
| 9 | 100% Cellulose | D | PEO***** | 4,000,000 | ++ | — | — |

Weight Average Molecular Weight (Mw)-nominal value reported by manufacturer.
*Polyethylene glycol commercially available from Union Carbide Corp. under the trademark PEG.
**Polyethyleneimine commercially available from Cordova Chemical Company under the trademark Corcat P-600 having a reported average molecular weight range of 40,000-60,000.
***Poly(ethylene oxide) commercially available from Union Carbide Corp. under the trademark Polyox WSRN-10.
****Poly(ethylene oxide) commercially available from Union Carbide Corp. under the trademark Polyox WSR-1105.
*****Poly(ethylene oxide) commercially available from Union Carbide Corp. under the trademark Polyox WSR-301.
++Slightly more additive was present in this example and the ratio is believed to be about 100:1.25.

TABLE 3B

| Example No. | Control (100% Cell.) | Sample A (1% Add.) | Sample B (2% Add.) | Sample C (5% Add.) |
|---|---|---|---|---|
| | Burst Pressure (mm Hg) | | | |
| 4 (PEG) | 356* | 369 | 355 | 340 |
| 5 (PEI) | 356* | 351 | 346 | 329 |
| 6 (PEO) | 348 | 359 | 363 | 349 |
| 7 (PEO) | 350 | 343 | 362 | — |
| 8 (PEO) | 350 | — | 350 | — |
| 9 (PEO) | 349 | 367 | — | — |
| | Casing Diameter at Burst (cm) | | | |
| 4 (PEG) | 3.9* | 3.6 | 3.7 | 3.6 |
| 5 (PEI) | 3.9* | 3.9 | 3.6 | 3.6 |
| 6 (PEO) | 3.8 | 3.9 | 3.8 | 3.8 |
| 7 (PEO) | 3.7 | 3.3 | 3.7 | — |
| 8 (PEO) | 3.5 | — | 3.6 | — |
| 9 (PEO) | 3.8 | 3.5 | — | — |

*Examples 4 and 5 utilized the same control sample.

The burst pressure and at burst diameter data in Table 3B indicate that cellulose articles made according to the present invention have a sufficient combination of strength and stretchability to withstand the pressures and internal forces encountered in stuffing and cooking operations to be utilized as sausage casings. Examples 6-9 (all of the invention) demonstrate that suitably strong films may be made over a range of levels of addition of poly(ethylene oxide) to cellulose and over a range of higher molecular weights. Films of the comparative Examples 4 and 5 show a lowering of burst pressure at increased concentrations of lower molecular weight additives PEG and PEI in cellulose. In contrast, when the higher molecular weight (100,000 and higher) PEO is used casing strength is maintained.

The tubular cellulose film casings of Examples 4A-8A and 4B-8B were shirred on apparatus and by a method similar to that disclosed in U.S. Pat. Nos. 2,984,574 and 4,578,842 into compressed sticks of casing using procedures similar to that for production of commercial shirred sticks of sausage casing. The shirred casing sticks of Examples 4, 5 and 8 all contained about 160 linear feet (48.8 meters) of casing which was shirred and compressed into sticks having the length indicated in Table 4B. Examples 6, 7 and 9 are for shirred sticks containing about 210 linear feet (64.0 meters). All of the casings of Examples 4-9 were similarly shirred using similar shirring parameters and equipment.

As each length of tubular cellulose casing was being shirred, a coating composition (shirr spray) was applied by metering through the shirring mandrel along with a stream of inflation air. For Examples 4-9 the amount applied was about 3 mg of coating composition per square inch of casing (0.5 mg/cm$^2$). The coating composition was a typical aqueous dispersion of a water-soluble cellulose ether (carboxymethyl cellulose), mineral oil, a surfactant (ethoxylated monodiglycerides) and a polyol (propylene glycol) such as disclosed in U.S. Pat. No. 4,596,727. Such composition facilitates shirring and provides a coated casing suitable for stuffing with meat emulsion on a high speed stuffing machine such as a Supermatic RT7 brand stuffer (available from Townsend Engineering Company of Des Moines, Iowa), and peeling on a high speed peeler such as a Ranger Apollo brand peeler (also available from Townsend Engineering Company). The resulting shirred coated casings had a moisture content between about 25-32 percent. Also, the coating compositions for Examples 4, 5, 7 and 8 contained about 18% of a polyol (propylene glycol) and application thereof to the casing is believed to have resulted in adding about 2.8% by weight (BDG) of polyol to the casing. In Examples 6 and 9 the coating composition contained a lesser amount of polyol (about 12% propylene glycol) which is believed to have resulted in adding about 1.8% by weight (BDG) of polyol to the casing. For each example, equal lengths of control casing and test casing were shirred into tubular In general, no problems were encountered with shirring any of the poly(ethylene oxide) containing casings. However, the comparative poly(ethylene glycol) (PEG) and poly(ethylenimine) (PEI) casings were difficult to shirr with examples 4A, 4B, 4C (PEG (MW=10,000)) and 5B, 5C (PEI (MW=40,000-60,000)) exhibiting excessive breakage during shirring and/or low water burst pressures when filled with water under pressure. The shirred casings were subjected to a series of stick property evaluations that are summarized below in Table 4A-4E.

TABLE 4A

| Example No. | Polymer Additive (Mol. Wt.) | AVERAGE STICK WEIGHT (gm) | | | | | | | |
|---|---|---|---|---|---|---|---|---|---|
| | | CONTROL | | SAMPLE A | | SAMPLE B | | SAMPLE C | |
| | | Initial | 7 Day | Initial | 7 Day | Initial | 7 Day | Initial | 7 Day |
| 4 | PEG (10000) | 141 | 141 | 124 | 121 | 125 | 124* | 125 | 124 |
| 5 | PEI (50000) | 141 | 141 | 125 | 125* | 126 | 119** | 125 | 125 |
| 6 | PEO (100000) | 192 | 188*** | 169 | 168*** | 170 | 164*** | 167 | 166*** |
| 7 | PEO (900000) | 194 | Nm | 171 | Nm | 170 | Nm | — | — |
| 8 | PEO (4000000) | 141 | 139 | 126 | 126 | 124 | 124 | — | — |

Nm = Not measured
*Measured 8 days after shirring.
**Measured 1 day after shirring (Sample weight measurements ranged from 109-125 grams. The standard deviation for other examples was typically about 1 gram or less.).
***Measured 98 days after shirring.
Example 4 and 5 utilized the same control sample.

TABLE 4B

| Example No. | Polymer Additive (Mol. Wt.) | AVERAGE STICK LENGTH (cm) | | | | | | | |
|---|---|---|---|---|---|---|---|---|---|
| | | CONTROL | | SAMPLE A | | A % DIFF. | | SAMPLE B | |
| | | Initial | 7 Day | Initial | 7 Day | Initial | 7 Day | Initial | 7 Day |
| 4 | PEG (10000) | 41.91+ | 43.15+ | 40.82 | 41.02 | 2.6% | 4.9% | 41.00 | 41.53* |
| 5 | PEI (50000) | 41.91+ | 43.15+ | 42.01 | 42.09* | −0.2% | 2.5% | 41.50 | 41.15** |
| 6 | PEO (100000) | 54.74 | 55.65*** | 51.03 | 51.74*** | 6.8% | 7.0% | 50.75 | 50.77*** |
| 7 | PEO (900000) | 54.31 | 55.17 | 50.70 | 51.94 | 6.6% | 5.9% | 50.60 | 51.08 |
| 8 | PEO (4000000) | 42.11 | 42.75 | 40.06 | 40.39 | 7.7% | 5.5% | 39.57 | 39.37 |

| Example No. | Polymer Additive (Mol. Wt.) | B % DIFF. | | SAMPLE C | | C % DIFF. | |
|---|---|---|---|---|---|---|---|
| | | Initial | 7 Day | Initial | 7 Day | Initial | 7 Day |
| 4 | PEG (10000) | 2.2% | 3.8% | 40.41 | 40.69 | 3.6% | 5.7% |
| 5 | PEI (50000) | 1.0% | 4.6% | 41.55 | 41.83 | 0.9% | 3.1% |
| 6 | PEO (100000) | 7.3% | 8.8% | 49.94 | 50.47*** | 8.8% | 9.3% |
| 7 | PEO (900000) | 6.8% | 7.4% | — | — | — | — |
| 8 | PEO (4000000) | 6.7% | 7.9% | — | — | — | — |

+Example 4 and 5 utilized the same control example.
*Measured 8 days after shirring.
**Measured 1 day after shirring.
***Measured 98 days after shirring.

sticks.

TABLE 4C

| Example No. | Polymer Additive (Mol. Wt.) | HORN FIT (cm) | | | | | | | |
|---|---|---|---|---|---|---|---|---|---|
| | | CONTROL | | SAMPLE A | | SAMPLE B | | SAMPLE C | |
| | | Initial | 7 Day | Initial | 7 Day | Initial | 7 Day | Initial | 7 Day |
| 4 | PEG (10000) | 1.35+ | 1.19+ | 1.36 | 1.34 | 1.36 | 1.34* | 1.37 | 1.35 |
| 5 | PEI (50000) | 1.35+ | 1.19+ | 1.36 | 1.30* | 1.35 | 1.35** | 1.35 | 1.32 |

TABLE 4C-continued

| Example No. | Polymer Additive (Mol. Wt.) | HORN FIT (cm) | | | | | | | |
|---|---|---|---|---|---|---|---|---|---|
| | | CONTROL | | SAMPLE A | | SAMPLE B | | SAMPLE C | |
| | | Initial | 7 Day | Initial | 7 Day | Initial | 7 Day | Initial | 7 Day |
| 6 | PEO (100000) | 1.32 | 1.28*** | 1.36 | 1.30*** | 1.36 | 1.31*** | 1.36 | 1.33*** |
| 7 | PEO (900000) | 1.33 | 1.26 | 1.36 | 1.31 | 1.36 | 1.33 | — | — |
| 8 | PEO (4000000) | 1.35 | 1.29 | 1.35 | 1.35 | 1.37 | 1.35 | — | — |

+Example 4 and 5 utilized the same control example.
*Measured 8 days after shirring.
**Measured 1 day after shirring.
***Measured 98 days after shirring.

TABLE 4D

| Example No. | Polymer Additive (Mol. Wt.) | COHERENCY (cmKg) | | | | | | | |
|---|---|---|---|---|---|---|---|---|---|
| | | CONTROL | | SAMPLE A | | SAMPLE B | | SAMPLE C | |
| | | Initial | 7 Day | Initial | 7 Day | Initial | 7 Day | Initial | 7 Day |
| 4 | PEG (10000) | 5.2+ | 3.7+ | 8.3 | 5.6 | 8.3 | 9.0* | 8.8 | 10.3 |
| 5 | PEI (50000) | 5.2+ | 3.7+ | 2.0 | 3.2* | 3.2 | 4.2** | 4.1 | 4.9 |
| 6 | PEO (100000) | 2.6 | 4.4*** | 8.9 | 9.7*** | 9.8 | 11.3*** | 10.1 | 10.2*** |
| 7 | PEO (900000) | 3.4 | 4.3 | 9.7 | 6.6 | 6.1 | 10.0 | — | — |
| 8 | PEO (4000000) | 2.6 | 4.1 | 10.0 | 11.0 | 7.3 | 10.2 | — | — |

+Example 4 and 5 utilized the same control example.
*Measured 8 days after shirring.
**Measured 1 day after shirring.
***Measured 98 days after shirring.

TABLE 4E

| Example No. | Polymer Additive (Mol. Wt.) | DESHIRR FORCE (7 DAYS AFTER SHIRRING) (NEWTON) | | | | | | | |
|---|---|---|---|---|---|---|---|---|---|
| | | CONTROL | | SAMPLE A | | SAMPLE B | | SAMPLE C | |
| | | LOW | HIGH | LOW | HIGH | LOW | HIGH | LOW | HIGH |
| 4 | PEG (10000) | 1.535 | 2.127 | 1.687 | 2.488 | 1.887* | 2.901* | 1.633 | 2.336 |
| 5 | PEI (50000) | 1.535 | 2.127 | 2.265* | 3.271* | 1.526** | 2.207** | 1.513 | 2.225 |
| 6*** | PEO (100000) | 1.949 | 3.204 | 2.060 | 3.662 | 2.092 | 3.458 | 2.060 | 3.729 |
| 7 | PEO (900000) | 2.065 | 3.204 | 2.221 | 3.475 | 2.287 | 3.324 | — | — |
| 8 | PEO (4000000) | 1.406 | 2.127 | 1.598 | 2.198 | 1.558 | 2.189 | — | — |

Example 4 and 5 utilized the same control example.
*Measured 8 days after shirring.
**Measured 1 day after shirring.
***All samples in Example 6 were measured 98 days after shirring.

The test results show all of the casings to have reduced stick weights of about 9-16% relative to the control samples. Examples 6A-8A and 6B-8B of the invention were poly(ethylene oxide) containing casings which show reduced stick lengths of about 6-9% and increased coherency values relative to control samples without undesirably large increases in deshirr forces. Comparative Examples 4A, 4B and 4C (PEG) showed some improvement in reducing stick length (2-6%) and coherency but not the dramatic improvements shown by the inventive casings. Comparative Examples 5A, 5B and 5C (PEI) show little or no improvement in stick length or coherency values. Also as noted above, the comparative Examples 4 and 5, particularly at higher additive concentrations tended to exhibit unacceptable breakage i.e. splitting and bursting of the casing wall during the shirring process. The casings of Examples 4 and 5 also tended to show unacceptably low water burst pressures which is indicative of a casing having insufficient resistance to bursting when filled e.g. with a wet food emulsion during a typical stuffing operation. The casings of the invention shirred as well as the control casing. The horn fit values of all the test casings exhibited excellent stability over time relative to the control samples. There was little reduction in the bore diameters measured after 7 days from the initial values measured soon after shirring. Shirring conditions were similar from example to example and no attempt was made to maximize the bore diameter of any particular casing. However, it is believed that the shorter shirred stick lengths for equal lengths of casing (which is also indicative of a higher pack ratio for the inventive casings which have increased bore diameters relative to the controls) suggest that shirred sticks may be produced with the inventive casings which have increased bore diameters relative to present commercial casings having a shirred stick length equal to that of the inventive casing.

The decreased stick lengths and weights are believed to be due to the absence of glycerine in the test casings relative to the control casings which were dipped in glycerine as is conventional to plasticize and soften the casing to prevent breakage during reeling, shirring and use. It is believed that all presently commercialized tubular, nonfibrous shirred cellulose sausage casings utilize added polyols such as glycerine to prevent breakage. The present invention is believed to produce for the first time a commercially acceptable shirred tubular cellulose casing having less than 5% (BDG) of any post-extrusion added softener or plasticizer (except for water) and makes possible the production of casings suitable for commercial high speed stuffing and peeling operations and having less than 5% of a polyol such glycerine, preferably less than 3% and beneficially substantially polyol free casing.

Shirred sticks of casings made according to Examples 4, 5, 8 and 9 above were conventionally stuffed to a typical recommended average stuffing diameter of about 23 mm for a nominal 3.3 cm flatwidth casing. For each example, control casings and test casings containing a peelability and shirring enhancing coating composition were similarly stuffed with a commercially available high collagen ground meat (beef and pork) emulsion. Stuffing was performed on a commercially available SuperMAtic RT-7 brand frankfurter stuffing machine manufactured by Townsend Engineering Co. of Des Moines, Iowa. The meat emulsion utilized and equipment set up and processing conditions and parameters were similar for all examples and controls. A 14/32 inch (1.11 cm) diameter stuffing horn was utilized and the pump speed was set at about 499 rpm. Stuffing breakage data are reported in Table 5A. Two separate tests were conducted of comparative Examples 4 and 5 and the stuffing breakage results are reported as examples 4i, 4ii, 5i and 5ii. Also, shirred sticks of casings made according to Examples 4, 5 and 9 above were similarly stuffed but to an average stuffed diameter of about 24 mm by adjusting (lowering) the linker speed of the stuffing machine. Other parameters were held constant. Stuffing breakage data for the 24 mm stuffed diameter casings and are reported in Table 5B below.

TABLE 5A

| Example No. | # of SHIRRED STICKS | STUFFING BREAKAGE (#/TYPE)* AT AVG. STUFFED DIAMETER (mm) | | | |
|---|---|---|---|---|---|
| | | CONTROL | SAMPLE A | SAMPLE B | SAMPLE C |
| 4i (PEG) | 2 | 1/1B (23 mm) | 8/5B, 3T (23 mm) | 7/3B, 4T (23 mm) | 1/1B (23 mm) |
| 4ii (PEG) | 1½ | NONE (23 mm) | 3/2B, 1PH (23 mm) | 2/2B (23 mm) | NONE (23 mm) |
| 5i (PEI) | 2 | 1/1T (23 mm) | NONE (23 mm) | 2/1B, 1T (23 mm) | 21/17B, 2T, 1PH, 1S (22 mm) |
| 5ii (PEI) | 1½ | NONE (23 mm) | 9/9B (23 mm) | 14/14B (23 mm) | — |
| 8 (PEO) | 3 | NONE (23 mm) | 1/1B (23 mm) | 6/4B, 1T, 1S (23 mm) | — |
| 9 (PEO) | 3 | NONE (23 mm) | NONE (23 mm) | — | — |

*Casing Breakage: B = Body; T = Twist; PH = Pinhole; S = Shoulder

TABLE 5B

| Example No. | # of SHIRRED STICKS | STUFFING BREAKAGE (#/TYPE)* AT AVG. STUFFED DIAMETER (mm) | | | |
|---|---|---|---|---|---|
| | | CONTROL | SAMPLE A | SAMPLE B | SAMPLE C |
| 4 (PEG) | 5 | NONE (24 mm) | 10/7B, 3T (24 mm) | 5/3B, 2T (24 mm) | 1/1T (24 mm) |
| 5 (PEI) | 5 | NONE (24 mm) | 5/4B, 1T (24 mm) | 15/10B, 3T, 1PH, 1S (24 mm) | 50/45B, 5T (24 mm) |
| 9 (PEO) | 3 | 3/1T, 2S (24 mm) | NONE (24 mm) | — | — |

*Casing Breakage: B = Body; T = Twist; PH = Pinhole; S = Shoulder

The PEI containing casing exhibited high levels of breakage at both stuffing diameters particularly for casings containing higher amounts of PEI. The PEG containing casings also exhibited a high level of breakage at the 1% and 2% additive levels. The inventive casing containing PEO generally exhibited little or no stuffing breakage particularly at low levels of added polymer additive.

EXAMPLES 10–18

Tubular seamless cellulose casing was made by a method similar to that described above. An olefinic oxide polymer (POLYOX WSR-301) was added to the viscose prior to extrusion to produce regenerated cellulose having poly(ethylene oxide) in the amount of 1% (BDG) for Examples 11, 13, 15 and 17 and in the amount of 2% (BDG) for Examples 12, 14, 16 and 18. Control Example 10 was 100% cellulose (BDG) having no added polymer. In control Example 10, the casing following regeneration and washing was dipped into a softener/plasticizer (glycerine) by passing the casing into and out of a tub of an aqueous solution of about 5–10% glycerine three times. In Examples 11–18 (all of the invention) the number of dips (which is proportional to the contact time of the casing with glycerine) were varied from 0 to 3 for the examples as indicated in Table 6. The amount of glycerine taken up (incorporated in and coated on) by the casing is reported as a weight percent based on BDG. Equal lengths (about 160 feet (48.8 meters)) of casings were similarly shirred into tubular sticks as described in the above examples and the shirred stick lengths (average of 5) and coherency values (average of 5) were measured initially the same day shirred and after 7 days and these data are reported in Table 6 below.

TABLE 6

| Example No. | Polymer Additive | Ratio of Cellulose to Additive | Glycerine DIPS # | Amt. Glycerine on Casing Wt. % (BDG) | Stick Length (cm) Initial | Stick Length (cm) 7 Days | Coherency (cmKg) Initial | Coherency (cmKg) 7 Days |
|---|---|---|---|---|---|---|---|---|
| 10 | None | — | 3 | 14.2 | 42.3 | 42.7 | 5.3 | 4.1 |
| 11 | PEO* | 99:1 | 3 | 17.2 | 41.9 | 42.4 | 5.9 | 7.3 |
| 12 | PEO* | 98:2 | 3 | 17.1 | 41.6 | 42.6 | 6.1 | 6.7 |
| 13 | PEO* | 99:1 | 2 | 13.0 | 40.6 | 41.8 | 7.7 | 7.5 |
| 14 | PEO* | 98:2 | 2 | 14.0 | 41.0 | 41.3 | 7.3 | 9.2 |
| 15 | PEO* | 99:1 | 1 | 7.8 | 40.6 | 40.8 | 9.1 | 10.4 |
| 16 | PEO* | 98:2 | 1 | 8.0 | 40.3 | 40.8 | 6.1 | 9.0 |
| 17 | PEO* | 99:1 | 0 | 0.3 | 40.1 | 40.4 | 9.1 | 11.0 |
| 18 | PEO* | 99:2 | 0 | 0.4 | 39.5 | 39.4 | 7.6 | 10.2 |

*Poly(ethylene oxide) commercially available from Union Carbide Corp. under the trademark POLYOX WSR-301 having a reported nominal average molecular weight of 4,000,000.

The data presented in Table 6 demonstrates that reducing or eliminating the addition of plasticizers such as glycerine results in shorter stick lengths for an equal amount of shirred casing relative to casing having added glycerine. The achievable packing efficiency is increased, which is desirable. This allows improved product attributes of either increased bore or increased pack ratio or a combination thereof. The data also indicate that glycerine is taken up faster by the inventive casing and that two dips with the inventive casing will take up about the same amount of glycerine plasticizer as three dips with the 100% cellulose control.

Thus the contact time of the inventive casing with the plasticizer may be reduced (by about 33% for Example 14) without reducing the level of added glycerine plasticizer. All examples of the invention exhibit excellent stick coherency values.

Reduction of stick lengths permits multiple sticks of shirred casing to be transported in smaller packages. It should also be apparent from this and the previous Examples 4-9 that reducing or eliminating plasticizers such as glycerine reduces the weight of each stick of casing thereby reducing shipping/transportation costs.

Comparison of initial average stick length values with those measured after seven days indicates that shirred sticks tend to have more stable (less change) lengths with decreasing glycerine content.

EXAMPLE 19-25

A cellulose article comprising fiber-reinforced (fibrous) tubular cellulose casing suitable for stuffing with a foodstuff such as meat was prepared by conventional apparatus and procedures. A commercially available paper web made and sold for use in the production of commercial fiber-reinforced casing was folded into a tube and the outside of the tube was coated with viscose as described above in a manner conventional in the art. As known in the art, the paper tube functions as the fiber-reinforcement and the applied viscose penetrates into the paper. The paper web may also be coated with viscose from the interior or from both sides of the paper. A control Example 19 (not of the invention) was made which did not contain any olefinic oxide polymer. In Examples 20-25, a 15% aqueous solution of olefinic oxide polymer comprising poly(ethylene oxide) (commercially available as POLYOX WSRN-10, as described above from Union Carbide Corp.) was uniformly mixed with a reduced viscose flow to produce a coating material which after regeneration had a cellulose to poly(ethylene oxide) weight ratio as indicated in the Table 7A. This solution was similarly prepared as for solution A of Example I. The poly(ethylene oxide) solution was added to viscose via a pigmentor normally used to add colorant to viscose in fibrous casing manufacture. The viscose was coated on a paper tube which then passed through a coagulation/regeneration bath typical of that utilized in fibrous sausage casing manufacture. After typical neutralization and washing steps, the casings of Examples 19, 20, 22 and 24 were passed through a tub containing about 10 weight percent glycerine in water. The casings of Examples 21, 23 and 25 omitted passage through the glycerine containing tubs. All of the casings of Examples 19-25 were then internally treated by slugging with a dry sausage treatment comprising an aqueous solution of about 1.2% of a polyamide-epichlorohydrin resin such as that commercially available under the treatment Kymene 4190 from Hercules Incorporated of Wilmington, Del., and about 5.8% glycerine. The treated casings were conventionally dried to a moisture level of about 6-10% based upon the Bone Dry Gauge weight and wound on reels. The wet thickness, flatwidth, bone dry gauge, polyol content, average wet mullens strength, at burst diameter, burst pressure and ultrafiltration were all measured and values reported in Table 7A below along with the circumferential burst stress which is calculated using the well known formula:

$$STRESS = \frac{BURST\ PRESSURE \times TUBE\ DIAMETER\ AT\ BURST}{TUBE\ WALL\ THICKNESS}$$

The reported values for Bone Dry Gauge (BDG), At Burst Diameter, Burst Pressure, and flatwidth are averages of two measurements and the wet thickness is an average of 5 measurements.

Prior to shirring, the reeled fibrous casing was unreeled and sprayed with about an 18% propylene glycol in water solution and rereeled. The casings were weighed before and after spraying and the added moisture is reported in Table 7B as weight percent relative to the weight of the casing prior to this spraying step. The rereeled casings were then similarly shirred into compressed sticks containing 120 foot (36.6 meter) lengths of casing. The lengths of the shirred sticks were measured and the weight measurement for two sticks (three for the control Example 19) are reported in Table 7B. Shirred stick length was measured initially on the same day shirred and then again twelve days after shirring. Test results are reported below in Tables 7A and 7B.

TABLE 7A

| Example No. | Weight Ratio* in Coating of Cellulose to PEO | Wet Thickness (micron) | Flat-width (cm) | Bone Dry Gauge (mg/cm) | Amount of Polyol in Casing (wt %) | Wet Mullens Burst Strength (kPa) | At Burst Diameter (cm) | Burst Pressure (mmHg) | Burst Stress MPa |
|---|---|---|---|---|---|---|---|---|---|
| 19 | —** | 115 | 6.18 | 73 | 24.7 | 276 | 4.79 | 810 | 45 |
| 20 | 98:2 | 110 | 6.26 | 74 | 24.2 | 252 | 4.76 | 801 | 46 |
| 21 | 98:2 | 107 | 6.29 | 81 | 1.5 | 299 | 4.79 | 941 | 56 |
| 22 | 95:5 | 112 | 6.30 | 73 | 20.0 | 241 | 4.76 | 786 | 45 |
| 23 | 95:5 | 100 | 6.45 | 72 | 3.6 | 252 | 4.76 | 836 | 53 |
| 24 | 93:7 | 111 | 6.25 | 71 | 21.1 | 226 | 4.76 | 793 | 45 |
| 25 | 93:7 | 106 | 6.24 | 71 | 0.8 | 217 | 4.75 | 797 | 48 |

*Ratio is for coating only and does not include cellulose of the paper web.
**No PEO was added in this control example (not of the invention).

TABLE 7B

| Example No. | Ultra-Filtration ($\Delta$ v/min. $M^2$ mmHg) | Added Moisture wt. % | Average Shirred Stick Length) | | |
|---|---|---|---|---|---|
| | | | Initial (cm) | 12 Days (cm) | % Change |
| 19 | 1.25 | 31.6 | 41.9 | 43.7 | +4.3 |
| 20 | .86 | 28.3 | 40.7 | 41.9 | +2.9 |
| 21 | .54 | 27.7 | 40.6 | 40.6 | 0 |
| 22 | 1.01 | 30.5 | 40.6 | 41.3 | +1.6 |
| 23 | .64 | 33.7 | 40.3 | 40.3 | 0 |
| 24 | .87 | 29.0 | 40.6 | 41.4 | +2.1 |
| 25 | .53 | 33.3 | 40.0 | 40.0 | 0 |

The data in Tables 7A–7B demonstrate that fibrous casing articles made with a coating having reduced cellulose and containing an olefin oxide polymer such as poly(ethylene oxide) have sufficient wet strength, burst pressure, and at burst diameter and circumferential burst stress values to indicate an ability to withstand the pressures and stresses encountered in stuffing casings with meat emulsion. The circumferential burst stress values indicate that the inventive casings of Examples 21, 23 and 25, which omitted the polyol tub dips were able to withstand significantly higher circumferential stresses before rupture. Reduced ultrafiltration values are reported for the inventive casings relative to the control. However, it is believed that the permeability of the inventive casing as indicated by the reported values is sufficient for use as sausage casings and may provide an advantage for separatory membrane applications requiring modified ultrafiltration rates. The shirring data indicate an important advantage in that equal lengths of casings may under the same conditions be shirred to shorter stick lengths. In particular, the glycerine dip may be omitted, which for Examples 21, 23 and 25 demonstrate remarkable shirred stick length stability relative to the glycerinated control Example 19 (not of the invention).

EXAMPLES 26–29

A series of seamless tubular cellulose films were produced via the viscose process described above. The tubular nonfibrous films designated Examples 26–29 were similarly made according to procedures described above, but differed in whether glycerine was added and in the amount and type of olefin oxide polymer additive (PEO) which was introduced prior to extrusion. The weight ratio of cellulose to additive was 98 to 2 based upon Bone Dry Gauge for Examples 28 and 29 of the invention. Example 28 was a cellulosic casing containing a 100,000 Mw poly(ethylene oxide) polymeric additive at a level of about 2% by weight BDG which was incorporated using a solution similar to that described above in Example 1 as Solution B. Similarly, Example 29 utilized a solution similar to that of Solution G of Example 1 to incorporate about 2% (BDG) of 4,000,000 Mw PEO into a cellulosic casing. Two control films (Examples 26 and 27) were also made from the same viscose supply without any polymer additive.

Film properties including burst pressure and diameter at burst were measured and results are reported in Tables 8A–8C.

For each example the same viscose supply was utilized for both the polymer additive containing film and the control films 26 and 27 which were made without any additive. Control film 26 was plasticized by dipping in glycerine and was substantially similar to seamless, tubular, nonfibrous, regenerated cellulose casing used commercially in the manufacture of small diameter skinless sausages. A second control film 27 was similar to the first control film 26, but omitted addition of any glycerine. The weight average molecular weight (Mw) of the cellulose in the films produced is believed to have been between about 95,000 to 120,000 and all of the films produced are believed to have had a similar Mw. Molecular weight distribution may be determined by the well known method of gel permeation chromatography (GPC). Examples 26 and 27 are comparative examples (not of the invention).

The films were all extruded to a similar flatwidth of about 3–3.5 cm. The values report in Table 8A for burst pressure and at burst diameter are averages of two measurements. The reported "dry" thickness value is an average of four measurements of the reel stock casing after drying and with moisture control, but prior to any shirring. All casings tested were moisturized after drying to level of about 11–16% BDG. The reported "wet" thickness values for control films 26 and 27 are an average of five measurements of sample film from four reels (20 measurements) whereas the wet thickness values for Examples 28 and 29 of the invention are averages of five measurements of sample film from ten reels of casing (50 measurements). The wet thickness measurements were of casing samples which were similarly soaked in water for at least 30 minutes. The circumferential burst stress was calculated according to the formula described above with respect to Examples 19–25, utilizing the average wet thickness values. Wet values are used to calculate burst stress values for conditions similar to those found in commercial practice where the tubular films are or become wet during stuffing operations.

TABLE 8A

| Example # | Ratio of Cellulose to Polyox in the Final Film | Glycerin | Dry Thickness (micron) | Wet Thickness (micron) | Burst Pressure (mmHg) | At Burst Diameter (cm) | Burst Stress (MPa) |
|---|---|---|---|---|---|---|---|
| 26 | 100:0 | Yes | 26 | 56.3 | 315 | 3.99 | 30 |
| 27 | 100:0 | No | 20 | 53.0 | 332 | 3.78 | 32 |
| 28 | 98:2* | No | 21 | 52.1 | 324 | 3.49 | 29 |
| 29 | 98:2** | No | 22 | 50.4 | 319 | 3.87 | 33 |

*Poly(ethylene oxide) commercially available from Union Carbide Corp. under the trademark Polyox WSRN-10.
**Poly(ethylene oxide) commercially available from Union Carbide Corp. under the trademark Polyox WSR-301.

The burst pressure, at burst diameter, and circumferential burst stress data in Table 8A indicate that cellulose articles made according to the present invention have a sufficient combination of strength and stretchability to withstand the pressures and internal forces encountered in stuffing and cooking operations to be utilized as sausage casings.

The tubular cellulose film casings of Examples 26–29 were shirred on apparatus and by a method similar to that disclosed in U.S. Pat. Nos. 2,984,574 and 4,578,842 into compressed sticks of casing using procedures similar to that for production of commercial shirred sticks of sausage casing. The shirred casing sticks of Examples 26–29 all contained about 110 linear feet (33.3 meters) of casing which was shirred and compressed into sticks having the lengths indicated in Table 8B. All of the casings were similarly shirred.

As each length of tubular cellulose casing was being shirred, a coating composition (shirr spray) was applied by metering through the shirring mandrel along with a stream of inflation air as described above for Examples 4–9.

The resulting shirred coated casings had a moisture content between about 30–36 percent. Also, the coating compositions contained about 18% of a polyol(propylene glycol) which is believed to have resulted in adding about 2.8% by weight (BDG) of polyol to the casing (BDG). This polyol acts as an antimycotic, humectant and plasticizer. For each example, equal lengths control casing and test casing were shirred into tubular sticks.

In general, no problems were encountered with shirring any of the casings. Generally, casings of lengths less than 160 feet are relatively easy to shirr, but shirring conventional casings of lengths of 190 feet or more generally require application of substantial forces which tend to result in shirring problems and higher levels of defective shirred casing having pinholes and other shirring related weaknesses which make the casings susceptible to failure during stuffing. The shirred casings were subjected to a series of stick property evaluations that are summarized below in Table 8B.

The test results show all of the nonglycerinated casings to have reduced stick weights of about 9–11% relative to the glycerated control Example 26. Examples 28 and 29 of the invention were poly(ethylene oxide) containing casings which show slightly reduced stick lengths and similar coherency and horn fit values relative to the control example. Shirring conditions were similar from example to example and no attempt was made to maximize the pack ratio or bore diameter of any particular casing. These Examples 26–29 show that shorter lengths of the casing may be shirred at lower pack ratios with casings of the present invention as compared to the more difficult to shirr longer lengths and higher pack ratio shirred sticks such as those disclosed in Examples 4–9. The dramatic improvements in shirring related properties of the present invention are more readily apparent for shirred sticks having high pack ratios.

The above shirred sticks of casings of Examples 26–29 to Examples 4 were conventionally stuffed to a typical recommended average stuffing diameter of about 23 mm for a nominal 3.3 cm flatwidth casing. For each example, control casings and test casings containing a peelability and shirring enhancing coating composition were similarly stuffed with a commercially available frankfurter meat emulsion. Stuffing was performed on a commercially available Supermatic RT-7 brand frankfurter stuffing machine manufactured by Townsend Engineering Co. of Des Moines, Iowa. The meat emulsion utilized and equipment set up and processing conditions and parameters were similar for all examples and controls.

A second stuffing test was conducted similar to that above, except that the casings were stuffed to larger stuffing diameter in order to test the casings under more stressful conditions. These casings were stuffed with a gelled polyacrylamide resin which was used as a meat emulsion substitute for test purposes. The stuffing breakage results and measurements of various properties are reported in Table 8C.

TABLE 8B

| Example # | Ratio of Cellulose to Polyox in the Final Film | Glycerin | Stick Weight (g) 5 Days | Stick Length (cm) Initial | Stick Length (cm) 5 Days | Coherency (cmKg) Initial | Coherency (cmKg) 5 Days | Horn Fit (cm) Initial | Horn Fit (cm) 5 Days |
|---|---|---|---|---|---|---|---|---|---|
| 26 | 100:0 | Yes | 98.5 | 38.74 | 38.81 | 4.1 | 7.1 | 1.372 | 1.346 |
| 27 | 100:0 | No | 88.2 | 38.43 | 38.86 | 4.6 | 7.4 | 1.361 | 1.328 |
| 28 | 98:2* | No | 90.1*** | 38.10 | 38.73*** | 4.3 | 7.6*** | 1.392 | 1.346*** |
| 29 | 98:2** | No | 87.9 | 38.10 | 38.56 | 5.5 | 6.8 | 1.397 | 1.346 |

*Poly(ethylene oxide) commercially available from Union Carbide Corp. under the trademark Polyox WSRN-10.
**Poly(ethylene oxide) commercially available from Union Carbide Corp. under the trademark Polyox WSR-301.
***Measured 3 days after shirring.

TABLE 8C

| | | | Test 1 | | | Test 2 | | |
|---|---|---|---|---|---|---|---|---|
| Example # | Ratio of Cellulose to Polyox in the Final Film | Glycerin | # Of Sticks Stuffed* | Measured Stuff Diameter (mm) | Stuffing Breakage (#/Type)+ | # Of Sticks Stuffed** | Measured Stuff Diameter (mm) | Stuffing Breakage (#/Type)+ |
| 26 | 100:0 | Yes | 3 | 22.91 | None | 10 | 24.5 | None |
| 27 | 100:0 | No | 3 | 23.00 | None | 10 | 24.5 | 4/2T, 2B |
| 28 | 98:2++ | No | 3 | 23.00 | None | 10 | 24.5 | 2/1B, 1PH |
| 29 | 98:2+++ | No | 3 | 22.97 | None | 10 | 24.5 | 3/2T, 1B |

*Casings stuffed with commercially available hot dog emulsion
**Casings stuffed with a polyacrylamide resin sold under the trade name TERRA-SORB by Industrial Services International, Inc. as a hot dog emulsion substitute.
+Casing breakage = B = Body, T = Twist, P = Pinhole, S = Shoulder
++Poly(ethylene oxide) commercially available from Union Carbide Corp. under the trademark Polyox WSRN-10.
+++Poly(ethylene oxide) commercially available from Union Carbide Corp. under the trademark Polyox WSR-301.

All of the casings of Examples 26–29 stuffed well, without any breakage, to the recommended stuffing diameter of about 23 mm. The repeated test using a meat emulsion substitute to overstuff to a stuffing diameter of 24.5 mm resulted in breakage of the unglycerinated casings. The 100,000 Mw PEO containing casing of Example 28 had half the number of breaks of the unglycerinated control Example 27. The 4,000,000 Mw PEO containing casing of Example 29 had one fewer break (2 versus 3) relative to unglycerinated control Example 27. These examples indicated that unglycerinated tubular cellulosic films containing an olefinic oxide polymer according to the present invention are less susceptible to stuffing breakage than unglycerinated cellulose casings made without any polymer additive.

A third stuffing test was conducted similar to the above tests on casings 26a, 27a and 28a which were from the same batch of casings as Examples 26–28, but aged for about one year. These casings of Examples 26a–28a and a fresh glycerinated control casing were similarly stuffed as above except that a gelled polyacrylamide resin was used as a meat emulsion substitute for test purposes and the stuffing diameter was about 23.5 mm. The stuffing breakage results test data are reported in Table 8D below.

TABLE 8D

| | | | Test 1 | | |
|---|---|---|---|---|---|
| Example # | Ratio of Cellulose to Polyox in the Final Film | Glycerin | # Of Sticks Stuffed* | Measured Stuff Diameter (mm) | Stuffing Breakage (#/Type)+ |
| Fresh Control | 100:0 | Yes | 7 | 23.5 | 1/1B |
| 26a | 100:0 | Yes | 7 | 23.5 | 1/1B |
| 27a | 100:0 | No | 15 | 23.5 | 3/3B |
| 28a | 98:2++ | No | 7 | 23.5 | 0 |

*Casings stuffed with a polyacrylamide resin sold under the trade name TERRA-SORB by Industrial Services International, Inc. as a hot dog emulsion substitute.
+Casing breakage = B = Body, T = Twist, P = Pinhole, S = Shoulder
++Poly(ethylene oxide) commercially available from Union Carbide Corp. under the trademark Polyox WSRN-10.
+++First two breaks occurred in first seven sticks tested.

The "fresh control" casing was a glycerinated commercial nonfibrous casing which was similar to Example 26a except that the shirring operation was conducted differently to obtain a length of 210 feet per shirred stick. This control was used to determine that the stuffing equipment was functioning properly. One break occurred in seven sticks of casing as it was stuffed. The one year old control casing of Example 26a also exhibited one break. The olefin oxide polymer free control (Example 27) which also did not have any added glycerine (but did have propylene glycol added during shirring) experienced two breaks in the first seven sticks stuffed. An additional eight sticks of the casing of Example 27a were stuffed and one additional break was noted. Seven sticks of the one year old casing of the invention (Example 28a) were stuffed without any breakage.

It is known that over time, cellulose casing tends to dry out, becomes more brittle and is subject to increased rates of breakage when handled or used e.g. as sausage casing unless it is sufficiently plasticized, typically with glycerine (which is a hygroscopic material). Regarding the present invention, it is believed that olefinic oxide polymers such as poly(ethylene oxide) obviate the need for polyols such as glycerine by replacing their plasticizing function. Cellulose casing containing poly(ethylene oxide) according to the present invention which has been aged for about one year after shirring has been stuffed and found to be not brittle. Instead, these aged casings of the invention remain sufficiently flexible and suitable to be stuffed and generally used as food casings e.g. for processing sausages such as skinless frankfurters. In contrast, similarly aged unglycerinated casings which are substantially pure regenerated cellulose not containing any added olefin oxide polymer such as poly(ethylene oxide) had an unduly high breakage rate during stuffing as seen above in Table 8D.

EXAMPLES 30–32

A series of seamless tubular cellulose films were produced via the viscose process described above. The tubular nonfibrous films designated Examples 30–32 were similarly made according to procedures described above, but differed in whether glycerine was added and in the amount of olefin oxide polymer additive (PEO) which was introduced prior to extrusion. Example 30 was a control film (not of the invention which was glycerinated by passing through 3 dip tubs and which did not contain any added olefin oxide polymer. Examples 31 and 32 were cellulose casings containing a 100,000 $M_w$ poly(ethylene oxide) polymer additive at a level of about 1% (Example 31) and 2% (Example 32) by weight BDG which was incorporated using a solution similar to that described above in Example 1 as Solution B. The casings of the inventive Examples 31 and 32 were unglycerinated. Casings of all three examples were similarly shirred in lengths of 230 feet (70.1 meters) using the same type of coatings during shirring. Stick weight, horn fit, stick length and coherency properties of the shirred sticks were measured and are reported below in Table 9.

TABLE 9

LONG LENGTH SHIRRING

| EXAMPLE NO. | RATIO OF CELLULOSE TO POLYOX WSRN-10 IN THE FINAL FILM | STICK WT. (gms) | | | HORN FIT (cm) | | |
|---|---|---|---|---|---|---|---|
| | | INITIAL | 7 DAYS | 60 DAYS | INITIAL | 7 DAYS | 60 DAYS |
| 30 | 100:0 | 208 | 208 | 205 | 1.295 | 1.270 | 1.267 |
| 31 | 99:1 | 184 | 184 | 182 | 1.323 | 1.308 | 1.306 |
| 32 | 98:2 | 182 | 182 | 180 | 1.318 | 1.318 | 1.303 |

| EXAMPLE NO | RATIO OF CELLULOSE TO POLYOX WSRN-10 IN THE FINAL FILM | STICK LENGTH (cm) | | | COHERENCY (cmKg) | | |
|---|---|---|---|---|---|---|---|
| | | INITIAL | 7 DAYS | 60 DAYS | INITIAL | 7 DAYS | 60 DAYS |
| 30 | 100:0 | 55.67 | 55.70 | 55.52 | 4.20 | 5.04 | 6.96 |
| 31 | 99:1 | 52.98 | 53.06 | 52.93 | 5.64 | 6.00 | 5.76 |
| 32 | 98:2 | 51.97 | 51.97 | 52.10 | 9.70 | 10.44 | 11.04 |

The results of the tests in Table 9 indicate that same lengths of the inventive casings may be shirred and compacted under the same conditions to shorter lengths of shirred sticks having less weight and larger horn fit sizes than prior art casing. The coherency values of the inventive casings are generally as good or much better than the control example.

Thus, equal lengths of the inventive casing may be shipped in lighter packages. Also, the inventive shirred sticks may be used on stuffing machines with larger diameter stuffing horns allowing faster production by increasing sausage throughput during stuffing without causing a deleterious loss of particle definition or emulsion break down. The invention allows the flexibility to change horn fit sizes or pack ratios to maximize the length of casing in a predetermined size stick length or maximize stuffing throughput or to have a better combination of horn fit and pack ratio relative to the prior art. Also, less work is required to similarly shirr the inventive casings to predetermined specifications of length, horn fit, pack ratio compared to prior art casings. Additionally, shirred waste due to pinhole defects and other shirring related terms is reduced.

The pack ratio for Example 32 was determined to be 8% higher than the control (Example 30) even though the packing efficiency for Example 32 was slightly lower than that for Example 30 (56.5% and 57.9% respectively). This means that the inventive casings produce an increased latitude in controlling shirring variables. In other words, if casing of the invention is packed to the same packing efficiency as the prior art casing, then the inventive casing will have a better combination of horn fit and pack ratio.

As mentioned before, the above examples serve only to illustrate the invention and its advantages, and they should not be interpreted as limiting since further modifications of the disclosed invention will be apparent to those skilled in the art. All such modifications are deemed to be within the scope of the invention as defined in the following claims.

What is claimed is:

1. A cellulosic tubular food casing containing an olefinic oxide polymer uniformly dispersed through the tube wall in admixture with the cellulose and in sufficient quantity so that the olefinic oxide polymer-to-cellulose weight ratio is at least about 1:200, and wherein said olefinic oxide polymer has an average molecular weight of at least about 70,000.

2. An article according to claim 1 wherein said olefinic oxide polymer is a homopolymer.

3. An article according to claim 1 wherein the weight ratio of olefinic oxide polymer to cellulose is less than about 1:9.

4. An article according to claim 1 wherein the tube does not contain fiber reinforcement.

5. An article according to claim 1 wherein the tube contains fiber reinforcement.

6. An article according to claim 1 wherein the article is shirred.

7. An article according to claim 1 wherein the article contains no polyhydric alcohol softening agent.

8. An article according to claim 1 wherein the article is a multilayer film.

9. An article according to claim 2 wherein said homopolymer is poly(ethylene oxide).

10. An article according to claim 9 wherein said article contains no more than about 5 weight % polyhydric alcohol softening agent on a bone dry basis.

11. An article according to claim 9 wherein said poly(ethylene oxide) has an average molecular weight of about 100,000.

12. An article according to claim 3 wherein the weight ratio of olefinic oxide polymer to cellulose is between about 1:20 and 1:100.

13. An article according to claim 8 wherein the interior surface layer of the tube contains said olefin oxide polymer and at least one other layer is free of olefin oxide polymer.

14. A casing according to claim 1 wherein said casing contains less than 5% by weight of polyol.

15. A casing according to claim 1 wherein said casing has liquid smoke incorporated therein.

16. A casing as defined in claim 1 wherein said casing tube wall thickness is between 0.7 to 2.0 mils.

17. A casing according to claim 1 wherein said casing has a circumference of at least 4.4 cm.

18. A casing according to claim 1 wherein said casing has a circumference of at least 10.4 cm.

19. A casing according to claim 1 wherein said casing has a circumference of between about 4.9 and 9.7 cm.

20. A casing according to claim 1 wherein said casing has a circumference of between about 10.4 and 54.9 cm.

21. A casing according to claim 1 wherein said tubular casing comprises a tube having an interior surface coated with a transferable edible colorant.

22. A casing according to claim 6 wherein said tubular casing comprises a tube having an interior surface coated with a peeling aid composition in an amount effective to promote peeling, wherein said peeling aid composition comprises a release agent and an anti-pleat lock agent.

23. A casing according to claim 22 wherein said peeling aid composition further comprises a surfactant.

24. A casing according to claim 22 wherein said release agent comprises a salt of carboxymethylcellulose.

25. A casing according to claim 22 wherein said peeling composition comprises a water soluble cellulose ether, a phospholipid and a polyol.

26. A casing according to claim 22, wherein said release agent is selected from the group consisting of water-soluble cellulose or their salts, dextrin, casein, alginates, lecithin, chitosan, a phospholipid, or mixtures thereof.

27. A casing according to claim 26, wherein said anti-pleat lock agent comprises an oil or phospholipid.

28. An article, as defined in claim 1, wherein said molecular weight is at least 90,000.

29. An article, as defined in claim 1, wherein said molecular weight is between about 100,000 and 4,000,000.

30. An article, as defined in claim 1, wherein said molecular weight is between 90,000 and 200,000.

31. An article, as defined in claim 1, wherein said molecular weight is less than 1,000,000.

32. A nonreinforced tubular cellulosic food casing in shirred form and without a polyhydric alcohol softening agent but containing poly(ethylene oxide) of greater than about 70,000 molecular weight and being uniformly dispersed through the tube wall in admixture with the cellulose and in sufficient quantity so that the poly(ethylene oxide)-to-cellulosic weight ratio is between about 0.5:95 and 5:95.

33. An article according to claim 32 wherein said article comprises a film having a moisture content less than about 35% by weight bone dry gauge, and a film thickness less than 23 microns.

34. An article according to claim 32 wherein said article comprises a shirred film of at least 190 feet.

35. An article according to claim 32 wherein said article comprises a shirred film of at least 210 feet.

36. An article according to claim 32 wherein said article comprises a shirred film of at least 230 feet.

* * * * *